(12) United States Patent  
Bivolarsky et al.

(10) Patent No.: US 9,609,342 B2  
(45) Date of Patent: Mar. 28, 2017

(54) COMPRESSION FOR FRAMES OF A VIDEO SIGNAL USING SELECTED CANDIDATE BLOCKS

(75) Inventors: Lazar Bivolarsky, Cupertino, CA (US); Mattias Nilsson, Sundbyberg (SE); Renat Vafin, Tallinn (EE); Soren Vang Andersen, Luxembourg (LU)

(73) Assignee: Skype, Dublin (IE)

( * ) Notice: Subject to any disclaimer, the term of this patent is extended or adjusted under 35 U.S.C. 154(b) by 433 days.

(21) Appl. No.: 12/838,124

(22) Filed: Jul. 16, 2010

(65) Prior Publication Data

US 2011/0206117 A1 Aug. 25, 2011

Related U.S. Application Data

(60) Provisional application No. 61/306,406, filed on Feb. 19, 2010.

(51) Int. Cl.
| | |
|---|---|
| *H04N 7/32* | (2006.01) |
| *H04N 19/48* | (2014.01) |
| *H04N 19/105* | (2014.01) |
| *H04N 19/176* | (2014.01) |
| *H04N 19/46* | (2014.01) |
| *H04N 19/61* | (2014.01) |
| *H04N 19/146* | (2014.01) |

(52) U.S. Cl.
CPC .......... *H04N 19/48* (2014.11); *H04N 19/105* (2014.11); *H04N 19/146* (2014.11); *H04N 19/176* (2014.11); *H04N 19/46* (2014.11); *H04N 19/61* (2014.11)

(58) Field of Classification Search
CPC ..... H04N 19/48; H04N 19/105; H04N 19/176
See application file for complete search history.

(56) References Cited

U.S. PATENT DOCUMENTS

| | | |
|---|---|---|
| 1,691,147 A | 11/1928 | Clark et al. |
| 4,833,535 A | 5/1989 | Ozeki et al. |
| 5,719,642 A | 2/1998 | Lee |

(Continued)

FOREIGN PATENT DOCUMENTS

| | | |
|---|---|---|
| CN | 1109245 | 9/1995 |
| CN | 1256049 | 6/2000 |

(Continued)

OTHER PUBLICATIONS

"International Search Report and Written Opinion", International Application No. PCT/EP2011/052449, (Apr. 20, 2011), 9 pages.

(Continued)

*Primary Examiner* — Zhubing Ren

(57) ABSTRACT

A method of selecting reference blocks for intra or inter prediction coding of a current block of a video signal. Each reference blocks is selected by: (i) determining a group of candidate blocks comprising at least some candidate blocks other than immediately adjacent spatial neighbors of the current block; and (ii) selecting one of the candidate blocks as the reference block based on a second metric, different from the first metric, the second metric relating to a number of bits that would be required in the encoded bitstream to encode both the residual block and the side information identifying the respective reference block.

28 Claims, 16 Drawing Sheets

(56) References Cited

U.S. PATENT DOCUMENTS

| | | | |
|---|---|---|---|
| 5,732,157 A | 3/1998 | Osawa | |
| 5,790,206 A | 8/1998 | Ju | |
| 6,091,767 A | 7/2000 | Westerman | |
| 6,091,777 A | 7/2000 | Guetz et al. | |
| 6,148,109 A | 11/2000 | Boon et al. | |
| 6,201,834 B1* | 3/2001 | Zhu | 375/240.27 |
| 6,408,026 B1 | 6/2002 | Tao | |
| 6,445,810 B2 | 9/2002 | Darrell et al. | |
| 6,650,782 B1 | 11/2003 | Joshi et al. | |
| 6,668,020 B2 | 12/2003 | Ma et al. | |
| 6,856,651 B2* | 2/2005 | Singh | 375/240 |
| 7,430,329 B1 | 9/2008 | Sarna | |
| 8,681,873 B2 | 3/2014 | Bivolarsky et al. | |
| 8,913,661 B2 | 12/2014 | Bivolarsky et al. | |
| 9,078,009 B2 | 7/2015 | Bivolarsky et al. | |
| 9,313,526 B2 | 4/2016 | Bivolarsky et al. | |
| 2001/0002205 A1 | 5/2001 | Beattie | |
| 2001/0014124 A1 | 8/2001 | Nishikawa | |
| 2002/0012396 A1* | 1/2002 | Pau et al. | 375/240.16 |
| 2003/0001757 A1 | 1/2003 | Kondo et al. | |
| 2003/0016751 A1 | 1/2003 | Vetro et al. | |
| 2003/0026340 A1 | 2/2003 | Divakaran et al. | |
| 2003/0067981 A1 | 4/2003 | Zhao et al. | |
| 2003/0081678 A1 | 5/2003 | Fukuda | |
| 2003/0179825 A1 | 9/2003 | Sekiguchi et al. | |
| 2003/0206588 A1 | 11/2003 | Etoh et al. | |
| 2004/0021592 A1 | 2/2004 | Karczewicz | |
| 2004/0057516 A1 | 3/2004 | Kim et al. | |
| 2004/0170395 A1 | 9/2004 | Filippini et al. | |
| 2004/0213348 A1 | 10/2004 | Kim et al. | |
| 2004/0228540 A1 | 11/2004 | Chen et al. | |
| 2005/0041740 A1 | 2/2005 | Sekiguchi et al. | |
| 2005/0094727 A1 | 5/2005 | Ha et al. | |
| 2005/0229200 A1 | 10/2005 | Kirkland et al. | |
| 2006/0013303 A1* | 1/2006 | Nguyen et al. | 375/240.11 |
| 2006/0104352 A1* | 5/2006 | Chen et al. | 375/240.03 |
| 2006/0120452 A1* | 6/2006 | Li | 375/240.16 |
| 2006/0152597 A1 | 7/2006 | Shimizu | |
| 2006/0153295 A1 | 7/2006 | Wang et al. | |
| 2006/0239354 A1 | 10/2006 | Amano et al. | |
| 2007/0104381 A1 | 5/2007 | Chen et al. | |
| 2007/0116370 A1 | 5/2007 | Smirnov | |
| 2007/0120967 A1 | 5/2007 | Eshkoli et al. | |
| 2007/0172135 A1 | 7/2007 | Song | |
| 2007/0177671 A1 | 8/2007 | Yang | |
| 2007/0217511 A1 | 9/2007 | Li et al. | |
| 2007/0253480 A1 | 11/2007 | Tsujii et al. | |
| 2008/0037642 A1 | 2/2008 | Tsuchiya | |
| 2008/0075171 A1 | 3/2008 | Suzuki | |
| 2008/0095230 A1 | 4/2008 | Hannuksela et al. | |
| 2008/0123750 A1 | 5/2008 | Bronstein et al. | |
| 2008/0192838 A1 | 8/2008 | Chen et al. | |
| 2008/0240247 A1 | 10/2008 | Lee et al. | |
| 2008/0273810 A1* | 11/2008 | Subramania et al. | 382/251 |
| 2009/0003437 A1 | 1/2009 | Cho et al. | |
| 2009/0060362 A1 | 3/2009 | Harmanci et al. | |
| 2009/0067503 A1 | 3/2009 | Jeong et al. | |
| 2009/0080788 A1 | 3/2009 | Lynch et al. | |
| 2009/0080804 A1 | 3/2009 | Hamada et al. | |
| 2009/0097548 A1 | 4/2009 | Karczewicz et al. | |
| 2009/0110054 A1 | 4/2009 | Kim et al. | |
| 2009/0180538 A1 | 7/2009 | Visharam et al. | |
| 2009/0225830 A1* | 9/2009 | He et al. | 375/240.03 |
| 2009/0257669 A1 | 10/2009 | Kim et al. | |
| 2010/0080297 A1 | 4/2010 | Wang et al. | |
| 2010/0166073 A1* | 7/2010 | Schmit et al. | 375/240.16 |
| 2010/0310065 A1 | 12/2010 | Chang et al. | |
| 2011/0206110 A1 | 8/2011 | Bivolarsky et al. | |
| 2011/0206113 A1 | 8/2011 | Bivolarsky et al. | |
| 2011/0206117 A1 | 8/2011 | Bivolarsky et al. | |
| 2011/0206118 A1 | 8/2011 | Bivolarsky et al. | |
| 2011/0206119 A1 | 8/2011 | Bivolarsky et al. | |
| 2011/0206131 A1 | 8/2011 | Vafin et al. | |
| 2011/0206132 A1 | 8/2011 | Bivolarsky et al. | |
| 2012/0044990 A1 | 2/2012 | Bivolarsky et al. | |

FOREIGN PATENT DOCUMENTS

| | | |
|---|---|---|
| CN | 1262496 | 8/2000 |
| CN | 1266589 | 9/2000 |
| CN | 1805544 | 7/2006 |
| CN | 101061722 | 10/2007 |
| CN | 101133650 | 2/2008 |
| CN | 101511014 | 8/2009 |
| CN | 101578769 | 11/2009 |
| CN | 101584120 | 11/2009 |
| EP | 0 639 925 A2 | 2/1995 |
| EP | 0639925 | 2/1995 |
| EP | 0 679 033 A2 | 10/1995 |
| EP | 0679033 | 10/1995 |
| EP | 1024456 | 8/2000 |
| EP | 1024456 A2 | 8/2000 |
| JP | 2007-60437 A | 3/2007 |
| JP | 200760437 | 3/2007 |
| JP | 2009509408 | 3/2009 |
| WO | WO 00/27128 A1 | 5/2000 |
| WO | WO-0027128 | 5/2000 |
| WO | WO 2007/011851 A2 | 1/2007 |
| WO | WO-2007011851 | 1/2007 |

OTHER PUBLICATIONS

"International Search Report and Written Opinion", International Application No. PCT/EP2011/052460, (May 24, 2011), 19 pages.

"International Search Report and Written Opinion", International Application No. PCT/EP2011/052446, (Dec. 29, 2011), 13 pages.

"International Search Report and Written Opinion", International Application No. PCT/EP2011/052458, (Oct. 14, 2011), 32 pages.

"International Search Report and Written Opinion", International Application No. PCT/EP2011/052464, (Sep. 1, 2011), 25 pages.

"International Search Report and Written Opinion", International Application No. PCT/EP2011/052465, (Sep. 26, 2011), 21 pages.

"International Search Report and Written Opinion", International Application No. PCT/EP2011/052462, (May 24, 2011), 14 pages.

"Invitation to Pay Additional Fees and, Where Applicable, Protest Fee and Partial International Search", International Application No. PCT/EP2011/052458, (May 31, 2011), 9 pages.

"Invitation to Pay Additional Fees and, Where Applicable, Protest Fee and Partial International Search", International Application No. PCT/EP2011/052464, (Jun. 29, 2011), 11 pages.

"Invitation to Pay Additional Fees and, Where Applicable, Protest Fee and Partial International Search", International Application No. PCT/EP2011/052465, (Jul. 5, 2011), 10 pages.

"Non-Final Office Action", U.S. Appl. No. 12/838,159, (Apr. 13, 2012), 11 pages.

"PCT Search Report and Written Opinion", Application No. PCT/EP2011/052463, (Mar. 16, 2012), 13 pages.

Barreto, et al., "Region-Based Super-Resolution for Compression", *Multidim Syst Sign Process*, vol. 18, (2007), pp. 59-81.

Ben-Ezra, Moshe et al., "Video Super-Resolution Using Controlled Subpixel Detector Shifts", *IEEE Transactions on Pattern Analysis and Machine Intelligence*, vol. 27(6), (2005), pp. 977-987.

Bivolarski, Lazar M., et al., "Design Considerations for Computationally Constrained Two-Way Real-Time Video Communication", *Applications of Digital Image Processing XXXII, A.G. Tescher, ed., in Proceedings of SPIE*, 7443:7440I-1-74430II-17, (2009), 17 pages.

Cavallaro, Andrea et al., "Perceptual Prefiltering for Video Coding", *Intelligent Multimedia, Video and Speech Processing, 2004. Proceedings of 2004 International Symposium on Hong Kong, China*, Oct. 20-22, 2004. Piscataway, NJ, IEEE, XP010801531, (Oct. 20, 2004), pp. 510-513.

Chang, Shih-Fu et al., "Manipulation and Compositing of MC-DCT Compressed Video", *Journal on Selected Areas in Communications*, 13(1), (Jan. 1, 1995), pp. 1-11.

Freina, Thomas et al., "Predictive Fractal Image Coding: Hybrid Algorithms and Compression of Residuals", *1998 Data Compression Conference*, (Mar. 30, 1998), p. 549.

(56) References Cited

OTHER PUBLICATIONS

Ginzburg, Alex et al., "DCT-Domain Coder for Digital Video Applications", *International Conference on Information Technology: Research and Education*, (Oct. 1, 2006), pp. 110-114.
Hayes, "Iterated Function Systems for Image and Video Coding", *Journal on Communications*, 45, (May 1, 1994), pp. 11-19.
Hoang, Dzung T., et al., "Efficient Cost Measures for Motion Compensation at Low Bit Rates", *Data Compression Conference*, (Mar. 31, 1996), 10 pages.
Hong, Guangming et al., "SenseCoding: Accelerometer-Assisted Motion Estimation for Efficient Video Encoding", *Proceedings of the 2008 ACM International Conference on Multimedia with Co-Located Symposium & Workshops: Area '08, Communicabilityms '08, HCC '08, MIR '08, MS'08, SAME '08, SRMC '08, TVS '08, VNBA '08*: Vancouver, BC, Canada, Oct. 27-31, 2008, XP0079186, (Oct. 26, 2008), pp. 749-752.
Lee, Jae-Beom et al., "Intra Prediction", *The VC-1 and H.264 Video Compression Standards for Broadband Video Services, NY: Springer Science+Business Media, LLC*, (2010), pp. 247-277.
Lee, Si-Woong et al., "Video Rate Control Using an Adaptive Quantization Based on a Combined Activity Measure", *Knowledge-Based Intelligent Information and Engineering Systems; [Lecture Notes in Computer Science; Lecture Notes in Artificial Intelligence; LNCS]*, Springer-Verlag, Berlin/Heidelberg, XP019015301, (Aug. 17, 2005), pp. 1297-1302.
Lin, Yih-Chuan et al., "Fast Full-Search Block-Matching Algorithm for Motion-Compensated Video Compression", *IEEE Transactions on Communications, IEEE Service Center*, Piscataway, NJ, vol. 45, No. 5, XP011008939, (May 1, 1997), pp. 527-531.
Molina, et al., "Towards a New Video Compression Scheme Using Super-Resolution", *Visual Communications and Image Processing, SPIE* vol. 6077, (2006), 11 pages.
Nuno, "Improving Multiscale Recurrent Pattern Image Coding with Enhanced Dictionary Updating Strategies", *Telecommunications Symposium*, (Sep. 1, 2006), pp. 257-262.
Richardson, Iain E., "H.264 and MPEG-4 Video Compression. Chapter 7: Design and Performance", *John Wiley & Sons, Ltd.* ISBN: 0-470-84837-5, (2003), pp. 225-234.
Richardson, Iain E., "H.264/MPEG4 Part 10", *H.264 and MPEG-4 Video Compression: Video Coding for Next-Generation Multimedia, John Wiley & Sons, Ltd.*, ISBN: 0-470-84837-5, (Oct. 17, 2003), 12 pages.
Rosenholtz, Ruth et al., "Perceptual Adaptive JPEG Coding", *Proceedings of the International Conference on Image Processing (ICIP)*, Lausanne, Sep. 16-19, 1996, New York, IEEE, US. vol. 1, XP010202284, (Sep. 16, 1996), pp. 901-904.
Schultz, Richard R., et al., "Subpixel Motion Estimation for Super-Resolution Image Sequence Enhancement", *Journal of Visual Communication and Image Representation*, vol. 9(1), (1998), pp. 38-50.
Segall, Andrew et al., "Improved High-Definition Video by Encoding at an Intermediate Resolution", *Visual Communications and Image Processing, SPIE* vol. 5308, (2004), pp. 1007-1018.
Song, Mingzhou et al., "Motion Estimation in DCT Domain", In Proceedings of ICCT 1996,(May 1996), pp. 670-674.
Sullivan, Gary J., et al., "Rate-Distortion Optimization for Video Compression", *IEEE Signal Processing Magazine*, 15(6), (Nov. 1, 1998), pp. 74-90.
Tang, Chih-Wei "Spatiotemporal Visual Considerations for Video Calling", *IEEE Transactions on Multimedia, IEEE Service Center*, Piscataway, NJ, US, vol. 9, No. 2, XP011157485, (Feb. 1, 2007), pp. 231-238.
Vasconcelos, Nuno et al., "Library-Based Coding: A Representation for Efficient Video Compression and Retrieval", *Data Compression Conference*, (Mar. 25, 1997), 10 pages.
Vasconcelos, Nuno et al., "Library-Based Image Coding", *Proceedings of the International Conference on Acoustics, Speech and Signal Processing*, 19, (Apr. 19, 1994), pp. 489-492.
Vitter, Jeffrey S., "Design and Analysis of Dynamic Huffman Codes", *Journal of the Association for Computing Machinery*, vol. 34, No. 4, (1987), pp. 825-845.
Wallace, Gregory K., "Overview of the JPEG (ISO/CCITT) Still Image Compression Standard", *Joint Photographic Expert Group Conference, Crowborough: JPEG Forum Ltd.*, GB, XP017203197, (Nov. 1, 1989), pp. 1-14.
Wiegand, Thomas et al., "Overview of the H.264/AVC Video Coding Standard", *IEEE Transactions on Circuits and Systems for Video Technology*, 13(7), (Jul. 2003), pp. 560-576.
Xiao, Feng "DCT-Based Video Quality Evaluation", *Final Project for EE392J*, Winter 2000, (2000), 10 pages.
Lee, J-B and Kalva, H., "Intra Prediction," in *The VC-1 and H.264 Video Compression Standards for Broadband Video Services* (NY: Springer Science+Business Media), pp. 247-277 (2010).
Weigand, T., et al., Overview of the H.264/AVC Video Coding Standard, *IEEE Transactions on Circuits and Systems for Video Technology*, 13(7): 560-576 (Jul. 2003).
Barreto, D., et al., "Region-based Super-Resolution for Compression," Multidim Syst Sign Process, vol. 18, pp. 59-81 (2007).
Ben-Ezra, M., et al., "Video Super-Resolution Using Controlled Subpixel Detector Shifts," IEEE Transactions on Pattern Analysis and Machine Intelligence, vol. 27(6), pp. 977-987 (2005).
Bivolarski, L.M., et al., "Design Considerations for Computationally Constrained Two-Way Real-Time Video Communication," Applications of Digital Image Processing XXXII, A.G. Tescher, ed., in Proc. of SPIE, 7443: 74430I-1-74430I-17 (2009).
Cavallaro, A. et al., "Perceptual prefiltering for video coding," Intelligent Multimedia, Video and Speech Processing, 2004. Proceedings of 2004 International Symposium on Hong Kong, China, Oct. 20-22, 2004. Piscataway, NJ, USA IEEE, pp. 510-513, XP010801531, Oct. 20, 2004.
Chang, S., et al., "Manipulation and compositing of MC-DCT compressed video," Journal on Selected Areas in Communications, 13(1): 1-11 (Jan. 1, 1995).
Ginzburg, A., et al., "DCT—Domain Coder for Digital Video Applications", 2006 International Conference on Information Technology: Research and Education, pp. 110-114 (Oct. 1, 2006).
Hayes, M.H., "Iterated Function Systems for Image and Video Coding," Journal on Communications, 45: 11-19 (May 1, 1994).
Hong, G. et al., "SenseCoding: Accelerometer-Assisted Motion Estimation for Efficient Video Encoding," Proceedings of the 2008 ACM International Conference on Multimedia with Co-Located Symposium & Workshops: Area'08, Communicabilityms'08, HCC'08, MIR'08, MS'08, SAME'08, SRMC'08, TVS'08, VNBA'08: Vancouver, BC, Canada, Oct. 27-31, 2008, ACM Pres, Oct. 26, 2008, pp. 749-752, XP007918610.
International Search Report and Written Opinion, PCT/EP2011/052462, Date of Mailing: May 24, 2011.
International Search Report and Written Opinion, PCT/EP2011/052464, date of mailing Sep. 1, 2011.
Invitation to Pay Additional Fees and Partial International Search Report, PCT/EP2011/052464, Date of Mailing: Jun. 29, 2011.
Invitation to Pay Additional Fees and, Where Applicable, Protest Fee and Partial International Search for Int'l Application No. PCT/EP2011/052458; Date of Mailing: May 31, 2011, 9 pp.
Invitation to Pay Additional Fees and, Where Applicable, Protest Fee, dated Jul. 5, 2011, for Application No. PCT/EP2011/052465, consisting of 11 pages.
Lee, S.-W. et al., "Video Rate Control Using an Adaptive Quantization Based on a Combined Activity Measure," Aug. 17, 2005, Knowledge-Based Intelligent Information and Engineering Systems; [Lecture Notes in Computer Science; Lecture Notes in Artificial Intelligence; LNCS], Springer-Verlag, Berlin/Heidelberg, pp. 1297-1302, XP019015301.
Lin, Y.C. et al., "Fast Full-Search Block-Matching Algorithm for Motion-Compensated Video Compression", IEEE Transactions on Communications, IEEE Service Center, Piscataway, NJ, USA, vol. 45, No. 5, XP011008939, May 1, 1997.
Molina, R., et al., "Toward a New Video Compression Scheme Using Super-Resolution," Visual Communications and Image Processing, SPIE vol. 6077 (2006).
Notification of Transmittal of the International Search Report and the Written Opinion of the International Searching Authority, dated Apr. 20, 2011, for Application No. PCT/EP2011/052449, consisting of 9 pages.

(56) References Cited

OTHER PUBLICATIONS

Notification of Transmittal of the International Search Report and the Written Opinion of the International Searching Authority, or the Declaration, International Application: PCT/EP2011/052446, Mailing Date: Dec. 29, 2011, 13 pp.
Notification of Transmittal of the International Search Report and the Written Opinion of the International Searching Authority, or the Declaration, PCT/EP2011/052458, Mailing Date: Oct. 14, 2011, 32 pp.
Notification of Transmittal of the International Search Report and the Written Opinion of the International Searching Authority for Int'l Application No. PCT/EP2011/052465; Date of Mailing: Sep. 26, 2011.
Richardson, I.E., "Design and Performance," H.264 and MPEG-4 Video Compression: Coding for Next-generation Multimedia, Chapter 7, pp. 225-234, XP030001627, ISBN: 0-470-84837-5 (Oct. 17, 2003).
Richardson, I.E., "H.264 and MPEG-4," H.264 and MPEG-4 Video Compression: Video Coding for Next-generation Multimedia, Chapter 6, Part 10, XP030001626, ISBN: 0-470-84837-5 (Oct. 17, 2003).
Rodrigues, N.M.M., et al., "Improving multiscale recurrent pattern image coding with enhanced dictionary updating strategies," Telecommunications Symposium, pp. 257-262 (Sep. 1, 2006).
Rosenholtz, R. et al., "Perceptual adaptive JPEG coding," Proceedings of the International Conference on Image Processing (ICIP) Lausanne, Sep. 16-19, 1996, New York, IEEE, US, vol. 1, Sep. 16, 1996, pp. 901-904, XP010202284.
Schultz, R., et al., "Subpixel Motion Estimation for Super-Resolution Image Sequence Enhancement," Journal of Visual Communication and Image Representation, vol. 9(1), pp. 38-50 (1998).
Segall, A., et al., "Improved High-Definition Video by Encoding at an Intermediate Resolution," Visual Communications and Image Processing, SPIE vol. 5308, pp. 1007-1018 (2004).
Song, M., et al., "Motion Estimation in DCT Domain," 1996 International Conference on Beijing Communication Technology Proceedings, 2: 670-674 (May 5, 1996).
Tang, C.-W. et al., "Spatiotemporal Visual Considerations for Video Coding," IEEE Transactions on Multimedia, IEEE Service Center, Piscataway, NJ, US, vol. 9, No. 2, Feb. 1, 2007, pp. 231-238, XP011157485.
Vasconcelos, N., et al., "Library-based coding: a representation for efficient video compression and retrieval," Data Compression Conference, pp. 121-130 (Mar. 25, 1997).
Vasconcelos, N., et al., "Library-based image coding," Proceedings of the International Conference on Acoustics, Speech and Signal Processing, 19: 489-492 (Apr. 19, 1994).
Vitter, J. S., "Design and Analysis of Dynamic Huffan Codes," Journal of the Association for Computing Machinery, vol. 34, No. 4, pp. 825-845 (1987).
Wallace, G.K., "Overview of the JPEG (ISO/CCITT) Still Image Compression Standard," Joint Photographic Expert Group Conference, Crowborough: JPEG Forum Ltd., GB, Nov. 1, 1989, XP017203197.
Xiao, Feng, "DCT-based Video Quality Evaluation," Final Project for EE392J, Winter 2000.
Freina, T., et al., "Predictive Fractal Image Coding: Hybrid Algorithms and Compression of Residuals," *IEEE Comput. Soc.*, pp. 549 (1998).
Mingzhou, S., et al., "Motion Estimation in DCT Domain," *IEEE*, vol. 5, pp. 670-674 (1996).
Richardson, I. E., "H.264 and MPEG-4 Video Compression. Chapter 7: Design and Performance," pp. 225-267 (2003).
Hoang, D. T., et al., "Efficient Cost Measures for Motion Compensation at Low Bit Rates," *IEEE Comput. Soc.*, pp. 102-111 (1996).
Sullivan, G. J., "Rate-Distortion Optimization for Video Compression," *IEEE Signal Processing Magazine*, vol. 15, No. 6, pp. 74-90 (1998).
Notification of Transmittal of the International Search Report and the Written Opinion of the International Searching Authority, or the Declaration, for Application No. PCT/EP2011/052460, mailed on May 24, 2011, consisting of 19 pages.
"Final Office Action", U.S. Appl. No. 12/838,159, (Jul. 24, 2012), 15 pages.
"Non-Final Office Action", U.S. Appl. No. 12/838,118, (Sep. 14, 2012), 16 pages.
"Non-Final Office Action", U.S. Appl. No. 12/838,131, (Aug. 30, 2012), 13 pages.
"Non-Final Office Action", U.S. Appl. No. 12/838,168, (Aug. 31, 2012), 16 pages.
"Restriction Requirement", U.S. Appl. No. 12/838,139, (Oct. 1, 2012), 6 pages.
"Restriction Requirement", U.S. Appl. No. 12/838,197, (Oct. 16, 2012), 6 pages.
"Final Office Action", U.S. Appl. No. 12/838,118, (Mar. 15, 2013), 16 pages.
"Final Office Action", U.S. Appl. No. 12/838,131, (Jan. 30, 2013), 15 pages.
"Final Office Action", U.S. Appl. No. 12/838,139, (Mar. 27, 2013), 12 pages.
"Final Office Action", U.S. Appl. No. 12/838,168, (Apr. 12, 2013), 19 pages.
"Final Office Action", U.S. Appl. No. 12/838,197, (May 9, 2013), 12 pages.
"Information Technology—JPEG 2000 image coding system: Core coding system", *ISO 15444 ITU-T Recommendation T.800*, (Aug. 2002), 212 pages.
"Non-Final Office Action", U.S. Appl. No. 12/838,139, (Dec. 7, 2012), 13 pages.
"Non-Final Office Action", U.S. Appl. No. 12/838,197, (Dec. 7, 2012), 14 pages.
"Notice of Allowance", U.S. Appl. No. 12/838,159, (Mar. 29, 2013), 11 pages.
"Preliminary Examination Report", Application No. PCT/EP2011/052465, (Jun. 5, 2012), 10 pages.
"Non-Final Office Action", U.S. Appl. No. 12/838,131, (Aug. 1, 2013), 15 pages.
"Non-Final Office Action", U.S. Appl. No. 13/029,710, (Aug. 23, 2013), 15 pages.
"Restriction Requirement", U.S. Appl. No. 13/029,710, (Jun. 10, 2013), 6 pages.
Sullivan, et al., "Video Compression—From Concepts to the H.264/AVC Standard", *Proceedings of the IEEE* vol. 93, No. 1, (Jan. 2005), pp. 18-31.
"Non-Final Office Action", U.S. Appl. No. 12/838,131, Feb. 27, 2014, 18 pages.
"Notice of Allowance", U.S. Appl. No. 12/838,159, Nov. 13, 2013, 12 pages.
"Final Office Action", U.S. Appl. No. 12/838,131, Nov. 26, 2013, 13 pages.
"Final Office Action", U.S. Appl. No. 13/029,710, Jan. 29, 2014, 20 pages.
Bennett, "Spectra of Quantized Signals", Bell System Technical Journal, vol. 27, Jul. 1948, pp. 446-472.
Brokish, et al., "A-Law and mu-Law Companding Implementations Using the TMS320C54x", Texas Instruments, Application Note: SPRA163A, Dec. 1997, 37 pages.
Kaneko, "A Unified Formulation of Segment Companding Laws and Synthesis of Codecs and Digital Compandors", Bell System Technical Journal, vol. 49, Sep. 1970, pp. 1555-1588.
Smith, "Instantaneous Companding of Quantized Signals", Bell System Technical Journal, vol. 36, May 1957, pp. 653-709.
"Non-Final Office Action", U.S. Appl. No. 12/838,197, Aug. 14, 2014, 14 pages.
"Non-Final Office Action", U.S. Appl. No. 12/838,139, Jul. 31, 2014, 16 pages.
"Non-Final Office Action", U.S. Appl. No. 12/838,168, Aug. 1, 2014, 16 pages.
"Non-Final Office Action", U.S. Appl. No. 13/029,710, Jul. 14, 2014, 17 pages.
"Non-Final Office Action", U.S. Appl. No. 12/838,118, Aug. 1, 2014, 18 pages.

(56) References Cited

OTHER PUBLICATIONS

"Notice of Allowance", U.S. Appl. No. 12/838,131, Aug. 11, 2014, 7 pages.
"Extended European Search Report", EP Application No. 13166503.6, Nov. 27, 2013, 7 pages.
"Final Office Action", U.S. Appl. No. 12/838,131, Jun. 6, 2014, 9 pages.
"Foreign Office Action", CN Application No. 201180010061.0, Aug. 11, 2014, 17 pages.
"Foreign Office Action", EP Application No. 11705195.3, Dec. 13, 2013, 5 pages.
"Final Office Action", U.S. Appl. No. 12/838,118, Jan. 22, 2015, 17 pages.
"Foreign Office Action", CN Application No. 201180010048.5, Nov. 2, 2014, 4 pages.
"Foreign Office Action", CN Application No. 201180010082.2, Nov. 25, 2014, 17 pages.
"Foreign Office Action", CN Application No. 201180010098.3, Dec. 2, 2014, 12 pages.
"Foreign Office Action", EP Application No. 11705195.3, Oct. 21, 2014, 5 pages.
"Foreign Office Action", EP Application No. 11705195.3, Dec. 3, 2013, 5 pages.
"Notice of Allowance", U.S. Appl. No. 12/838,197, Mar. 2, 2015, 8 pages.
"Final Office Action", U.S. Appl. No. 12/838,168, Jan. 2, 2015, 18 pages.
"Final Office Action", U.S. Appl. No. 13/029,710, Nov. 17, 2014, 21 pages.
"Foreign Office Action", CN Application No. 201180010045.1, Oct. 8, 2014, 22 pages.
"Foreign Office Action", CN Application No. 201180010090.7, Nov. 3, 2014, 16 pages.
"Foreign Office Action", CN Application No. 201180010214.1, Nov. 25, 2014, 16 pages.
"Foreign Office Action", CN Application No. 201180010289.X, Dec. 16, 2014, 14 pages.
Hoang,"Efficient Cost Measures for Motion Estimation at Low Bit Rates", IEEE Transactions on Circuits and Systems for Video Technology vol. 8 No. 4, Aug. 31, 1998, 13 pages.
Netravali,"Digital Pictures", 2nd Edition, Plenum Press, Ch. 1, pp. 38-39; Ch. 5 pp. 366-367 & pp. 406-409; Ch. 6 pp. 540-543., Jan. 31, 1995, 6 pages.
Song,"Research on Super Resolution Reconstruction of Video and Image Sequences", China Doctor Dissertation, Full-text Database, Collection of Information, Science and Technology—English Abstract pp. 8-9, Jan. 15, 2014, 44 pages.
Zhu,"Transform-Exempted Calculation of Sum of Absolute Hadamard Transformed Differences", IEEE Transactions on Circuits and Systems for Video Technology archive vol. 19 Issue 8, Aug. 2009, 6 pages.
"Corrected Notice of Allowance", U.S. Appl. No. 13/029,710, Feb. 16, 2016, 2 pages.
"Corrected Notice of Allowance", U.S. Appl. No. 13/029,710, Mar. 14, 2016, 2 pages.
"Examiner's Answer to Appeal Brief", U.S. Appl. No. 12/838,118, Feb. 11, 2016, 20 pages.
"Examiner's Answer to Appeal Brief", U.S. Appl. No. 12/838,168, Feb. 12, 2016, 27 pages.
"Foreign Office Action", CN Application No. 201180010045.1, Feb. 15, 2016, 7 pages.
"Foreign Office Action", CN Application No. 201180010048.5, Feb. 14, 2016, 13 pages.
"Foreign Office Action", CN Application No. 201180010090.7, Feb. 22, 2016, 7 pages.
"Corrected Notice of Allowance", U.S. Appl. No. 13/029,710, Dec. 9, 2015, 2 pages.
"Foreign Office Action", CN Application No. 201180010061.0, Nov. 11, 2015, 11 pages.
"Foreign Office Action", CN Application No. 201180010082.2, Dec. 9, 2015, 8 pages.
"Notice of Allowance", U.S. Appl. No. 13/029,710, Nov. 25, 2015, 7 pages.
"Foreign Office Action", CN Application No. 201180010045.1, Nov. 2, 2015, 7 pages.
"Foreign Office Action", CN Application No. 201180010082.2, Sep. 2, 2015, 8 pages.
"Foreign Office Action", CN Application No. 201180010090.7, Sep. 9, 2015, 8 pages.
"Foreign Office Action", CN Application No. 201180010098.3, Oct. 21, 2015, 7 pages.
"Foreign Office Action", CN Application No. 201180010289.X, Nov. 2, 2015, 11 pages.
"Foreign Office Action", EP Application No. 11705195.3, Sep. 15, 2015, 4 pages.
"Foreign Notice of Allowance", CN Application No. 201180010289.X, Apr. 7, 2016, 4 pages.
"Foreign Notice of Allowance", CN Application No. 201180010082.2, Apr. 21, 2016, 4 pages.
"Foreign Notice of Allowance", CN Application No. 201180010098.3, Apr. 21, 2016, 4 pages.
"Foreign Office Action", CN Application No. 201180010061.0, Apr. 21, 2016, 6 pages.
"Foreign Office Action", CN Application No. 201180010214.1, May 10, 2016, 6 pages.
"Foreign Office Action", CN Application No. 201180010048.5, Jun. 2, 2016, 9 pages.
"Final Office Action", U.S. Appl. No. 12/838,139, May 20, 2015, 17 pages.
"Foreign Office Action", CN Application No. 201180010045.1, Apr. 30, 2015, 12 pages.
"Foreign Office Action", CN Application No. 201180010048.5, May 15, 2015, 10 pages.
"Foreign Office Action", CN Application No. 201180010061.0, Jun. 12, 2015, 10 pages.
"Non-Final Office Action", U.S. Appl. No. 13/029,710, Jul. 8, 2015, 22 pages.
"Supplemental Notice of Allowance", U.S. Appl. No. 12/838,197, Jun. 5, 2015, 2 pages.
"International Preliminary Report on Patentability", Application No. PCT/EP2011/052446, Aug. 30, 2012, 8 pages.
"International Preliminary Report on Patentability", Application No. PCT/EP2011/052463, Aug. 30, 2012, 8 pages.
"Foreign Notice of Allowance", CN Application No. 201180010214.1, Jan. 10, 2017, 4 pages.

\* cited by examiner

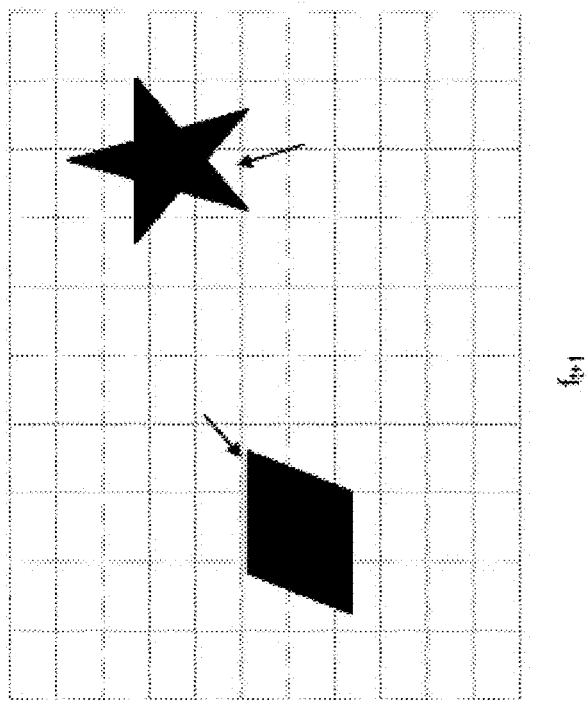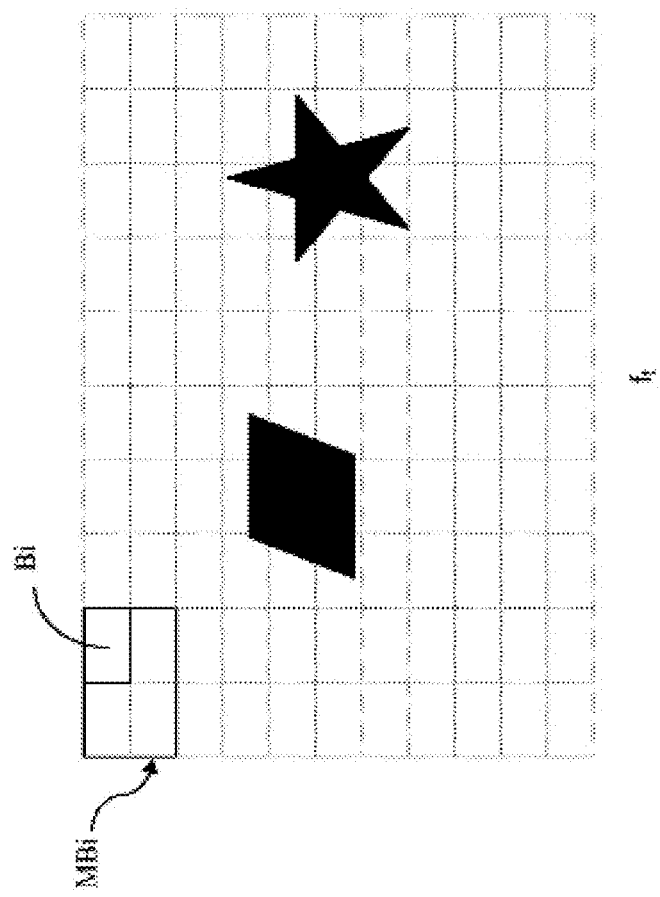

Initial Blocks

| -320 | 304 | 0 | 0 | 0 | 0 | 0 | 0 | -320 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | -304 | 0 | 0 | 0 | 0 | 0 | 0 | 0 |
| 0 | 0 | 0 | 0 | 0 | 0 | 0 | 0 | 400 | 0 | 0 | 0 | 0 | 0 | 0 | 0 |
| 0 | 0 | 0 | 0 | 0 | 0 | 0 | 0 | 304 | 0 | 0 | 0 | 0 | 0 | 0 | 0 |
| 0 | 0 | 0 | 0 | 0 | 0 | 0 | 0 | -640 | 0 | 0 | 0 | 0 | 0 | 0 | 0 |
| 0 | 0 | 0 | 0 | 0 | 0 | 0 | 0 | -304 | 0 | 0 | 0 | 0 | 0 | 0 | 0 |
| 0 | 0 | 0 | 0 | 0 | 0 | 0 | 0 | 400 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| -320 | 304 | 0 | 0 | 0 | 0 | 0 | 0 | -640 | 0 | 0 | 0 | 0 | 0 | 0 | 0 |
|---|---|---|---|---|---|---|---|---|---|---|---|---|---|---|---|
| 304 | -288 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | -400 | 0 | 0 | 0 | 0 | 0 | 0 | 0 |
| 0 | 0 | 0 | 0 | 0 | 0 | 0 | 0 | 304 | 0 | 0 | 0 | 0 | 0 | 0 | 0 |
| 0 | 0 | 0 | 0 | 0 | 0 | 0 | 0 | -320 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 320 | -304 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | -304 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 320 | 0 | 0 | 0 | 0 | 0 | 0 | 0 | -320 | -304 | 0 | 0 | 0 | 0 | 0 | 0 |
|---|---|---|---|---|---|---|---|---|---|---|---|---|---|---|---|
| -304 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 400 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 3a

Initial Blocks

| -320 | 304 | 0 | 0 | 0 | 0 | 0 | 0 | -320 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | -304 | 0 | 0 | 0 | 0 | 0 | 0 | 0 |
| 0 | 0 | 0 | 0 | 0 | 0 | 0 | 0 | 400 | 0 | 0 | 0 | 0 | 0 | 0 | 0 |
| 0 | 0 | 0 | 0 | 0 | 0 | 0 | 0 | 304 | 0 | 0 | 0 | 0 | 0 | 0 | 0 |
| 0 | 0 | 0 | 0 | 0 | 0 | 0 | 0 | -640 | 0 | 0 | 0 | 0 | 0 | 0 | 0 |
| 0 | 0 | 0 | 0 | 0 | 0 | 0 | 0 | -304 | 0 | 0 | 0 | 0 | 0 | 0 | 0 |
| 0 | 0 | 0 | 0 | 0 | 0 | 0 | 0 | 400 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| -320 | 304 | 0 | 0 | 0 | 0 | 0 | 0 | -640 | 0 | 0 | 0 | 0 | 0 | 0 | 0 |
|---|---|---|---|---|---|---|---|---|---|---|---|---|---|---|---|
| 304 | -288 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | -400 | 0 | 0 | 0 | 0 | 0 | 0 | 0 |
| 0 | 0 | 0 | 0 | 0 | 0 | 0 | 0 | 304 | 0 | 0 | 0 | 0 | 0 | 0 | 0 |
| 0 | 0 | 0 | 0 | 0 | 0 | 0 | 0 | -320 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 320 | -304 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | -304 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 320 | 0 | 0 | 0 | 0 | 0 | 0 | 0 | -320 | -304 | 0 | 0 | 0 | 0 | 0 | 0 |
|---|---|---|---|---|---|---|---|---|---|---|---|---|---|---|---|
| -304 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 400 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| 1 | 2 | 3 | 4 | 5 | 6 | 7 | 8 | 9 | | |
|---|---|---|---|---|---|---|---|---|---|---|
| 0 | -288 | 304 | -304 | 320 | -320 | 400 | -400 | -640 | | Values in each Bin |
| 487 | 1 | 5 | 6 | 2 | 5 | 3 | 1 | 2 | | Frequency |

| 1 | 2 | 3 | 4 | 5 | 6 | 7 | 8 | 9 | | #Bins After Prediction |
|---|---|---|---|---|---|---|---|---|---|---|
| 0 | -288 | 304 | -304 | 320 | -320 | 400 | -400 | -640 | | Values in each Bin |
| 498 | 1 | 2 | 3 | 1 | 3 | 2 | 1 | 1 | | Frequency |

| 1 | 2 | 3 | 4 | 5 | 6 | 7 | 8 | 9 | | |
|---|---|---|---|---|---|---|---|---|---|---|
| 0 | -304 | 304 | -320 | 400 | 320 | -640 | -288 | -400 | | Values in each Bin |
| 487 | 6 | 5 | 5 | 3 | 2 | 2 | 1 | 1 | | Frequency |
| | 2.06 | 2.32 | 2.32 | 3.06 | 3.64 | 3.64 | 4.64 | 4.64 | | |
| | 12.35 | 11.61 | 11.61 | 9.18 | 7.29 | 7.29 | 4.64 | 4.64 | 68.61 bits | Total Bits Before Prediction |

| 1 | 2 | 3 | 4 | 5 | 6 | 7 | 8 | 9 | | |
|---|---|---|---|---|---|---|---|---|---|---|
| 0 | -320 | -304 | 400 | 304 | -288 | 320 | -400 | -640 | | |
| 498 | 3 | 3 | 2 | 2 | 1 | 1 | 1 | 1 | | Frequency |
| | 2.22 | 2.22 | 2.81 | 2.81 | 3.81 | 3.81 | 3.81 | 3.81 | | |
| | 6.67 | 6.67 | 5.61 | 5.61 | 3.81 | 3.81 | 3.81 | 3.81 | 39.79 bits | Total Bits Before Prediction |

Savings 28.82  Total Bits Saved

Transmitted Coeff for Fr1 MB 1 Block 14

| 0 | -288 | 224 | 0 |
|---|------|-----|---|
| 0 | 736 | -288 | 0 |
| -224 | -288 | 224 | 0 |
| 288 | 368 | -288 | 0 |

2 Coeff Less

Transmitted Coeff for Fr1 MB 1 Block 23

| 0 | 864 | 224 | 0 |
|---|-----|-----|---|
| 0 | 368 | 0 | 0 |
| 0 | 0 | 0 | 0 |
| 0 | 0 | 0 | 0 |

2 Coeff Less

Transmitted Coeff for Fr2 MB 0 Block 0

| 2464 | -4896 | -2688 | -1440 |
|------|-------|-------|-------|
| 576 | -368 | -288 | 0 |
| 672 | -576 | -224 | 0 |
| 0 | 0 | 0 | 0 |

1 Coeff Less

Transmitted Coeff for Fr2 MB 0 Block 11

| 224 | 0 | -448 | 0 |
|-----|---|------|---|
| -288 | 0 | 288 | 0 |
| 448 | 288 | 0 | 0 |
| -288 | 0 | 0 | 0 |

1 Coeff Less

FIG. 5b Cont'd

COMPRESSION FOR FRAMES OF A VIDEO SIGNAL USING SELECTED CANDIDATE BLOCKS

RELATED APPLICATION

This application claims the benefit of U.S. Provisional Application No. 61/306,406, filed on Feb. 19, 2010. The entire teachings of the above application are incorporated herein by reference.

TECHNICAL FIELD

The present invention relates to the encoding and transmission of video streams.

BACKGROUND

In the transmission of video streams, efforts are continually being made to reduce the amount of data that needs to be transmitted whilst still allowing the moving images to be adequately recreated at the receiving end of the transmission. A video encoder receives an input video stream comprising a sequence of "raw" video frames to be encoded, each representing an image at a respective moment in time. The encoder then encodes each input frame into one of two types of encoded frame: either an intra frame (also known as a key frame), or an inter frame. The purpose of the encoding is to compress the video data so as to incur fewer bits when transmitted over a transmission medium or stored on a storage medium.

An intra frame is compressed using data only from the current video frame being encoded, typically using intra frame prediction coding whereby one image portion within the frame is encoded and signalled relative to another image portion within that same frame. This is similar to static image coding. An inter frame on the other hand is compressed using knowledge of a preceding frame (a reference frame) and allows for transmission of only the differences between that reference frame and the current frame which follows it in time. This allows for much more efficient compression, particularly when the scene has relatively few changes. Inter frame prediction typically uses motion estimation to encode and signal the video in terms of motion vectors describing the movement of image portions between frames, and then motion compensation to predict that motion at the receiver based on the signalled vectors. Various international standards for video communications such as MPEG 1, 2 & 4, and H.261, H.263 & H.264 employ motion estimation and compensation based on regular block based partitions of source frames. Depending on the resolution, frame rate, bit rate and scene, an intra frame can be up to 20 to 100 times larger than an inter frame. On the other hand, an inter frame imposes a dependency relation to previous inter frames up to the most recent intra frame. If any of the frames are missing, decoding the current inter frame may result in errors and artefacts.

These techniques are used for example in the H.264/AVC standard (see T. Wiegand, G. J. Sullivan, G. Bjontegaard, A. Luthra: "Overview of the H.264/AVC video coding standard," in IEEE Transactions on Circuits and Systems for Video Technology, Volume: 13, Issue: 7, page(s): 560-576, July 2003).

FIG. 7 illustrates a known video encoder for encoding a video stream into a stream of inter frames and interleaved intra frames, e.g. in accordance with the basic coding structure of H.264/AVC. The encoder receives an input video stream comprising a sequence of frames to be encoded (each divided into constituent macroblocks and subdivided into blocks), and outputs quantized transform coefficients and motion data which can then be transmitted to the decoder. The encoder comprises an input 70 for receiving an input macroblock of a video image, a subtraction stage 72, a forward transform stage 74, a forward quantization stage 76, an inverse quantization stage 78, an inverse transform stage 80, an intra frame prediction coding stage 82, a motion estimation & compensation stage 84, and an entropy encoder 86.

The subtraction stage 72 is arranged to receive the input signal comprising a series of input macroblocks, each corresponding to a portion of a frame. From each, the subtraction stage 72 subtracts a prediction of that macroblock so as to generate a residual signal (also sometimes referred to as the prediction error). In the case of intra prediction, the prediction of the block is supplied from the intra prediction stage 82 based on one or more neighbouring regions of the same frame (after feedback via the reverse quantization stage 78 and reverse transform stage 80). In the ease of inter prediction, the prediction of the block is provided from the motion estimation & compensation stage 84 based on a selected region of a preceding frame (again after feedback via the reverse quantization stage 78 and reverse transform stage 80). For motion estimation the selected region is identified by means of a motion vector describing the offset between the position of the selected region in the preceding frame and the macroblock being encoded in the current frame.

The forward transform stage 74 then transforms the residuals of the blocks from a spatial domain representation into a transform domain representation, e.g. by means of a discrete cosine transform (DCT). That is to say, it transforms each residual block from a set of pixel values at different Cartesian x and y coordinates to a set of coefficients representing different spatial frequency terms with different wavenumbers $k_x$ and $k_y$ (having dimensions of 1/wavelength). The forward quantization stage 76 then quantizes the transform coefficients, and outputs quantised and transformed coefficients of the residual signal to be encoded into the video stream via the entropy encoder 86, to thus form part of the encoded video signal for transmission to one or more recipient terminals.

Furthermore, the output of the forward quantization stage 76 is also fed back via the inverse quantization stage 78 and inverse transform stage 80. The inverse transform stage 80 transforms the residual coefficients from the frequency domain back into spatial domain values where they are supplied to the intra prediction stage 82 (for intra frames) or the motion estimation & compensation stage 84 (for inter frames). These stages use the reverse transformed and reverse quantized residual signal along with knowledge of the input video stream in order to produce local predictions of the intra and inter frames (including the distorting effect of having been forward and reverse transformed and quantized as would be seen at the decoder). This local prediction is fed back to the subtraction stage 72 which produces the residual signal representing the difference between the input signal and the output of either the local intra frame prediction stage 82 or the local motion estimation & compensation stage 84. After transformation, the forward quantization stage 76 quantizes this residual signal, thus generating the quantized, transformed residual coefficients for output to the entropy encoder 86. The motion estimation stage 84 also outputs the motion vectors via the entropy encoder 86 for inclusion in the encoded bitstream.

When performing intra frame encoding, the idea is to only encode and transmit a measure of how a portion of image data within a frame differs from another portion within that same frame. That portion can then be predicted at the decoder (given some absolute data to begin with), and so it is only necessary to transmit the difference between the prediction and the actual data rather than the actual data itself. The difference signal is typically smaller in magnitude, so takes fewer bits to encode.

In the case of inter frame encoding, the motion compensation stage 84 is switched into the feedback path in place of the intra frame prediction stage 82, and a feedback loop is thus created between blocks of one frame and another in order to encode the inter frame relative to those of a preceding frame. This typically takes even fewer bits to encode than an intra frame.

FIG. 8 illustrates a corresponding decoder which comprises an entropy decoder 90 for receiving the encoded video stream into a recipient terminal, an inverse quantization stage 92, an inverse transform stage 94, an intra prediction stage 96 and a motion compensation stage 98. The outputs of the intra prediction stage and the motion compensation stage are summed at a summing stage 100.

There are many known motion estimation techniques. Generally they rely on comparison of a block with one or more other image portions from a preceding frame (the reference frame). Each block is predicted from an area of the same size and shape as the block, but offset by any number of pixels in the horizontal or vertical direction or even a fractional number of pixels. The identity of the area used is signalled as overhead ("side information") in the form of a motion vector. A good motion estimation technique has to balance the requirements of low complexity with high quality video images. It is also desirable that it does not require too much overhead information.

In the standard system described above, it will be noted that the intra prediction coding and inter prediction coding (motion estimation) are performed in the unquantized spatial domain.

More recently, motion estimation techniques operating in the transform domain have attracted attention. However, none of the existing techniques are able to perform with low complexity (thus reducing computational overhead), while also delivering high quality. Hence no frequency domain techniques for motion estimation are currently in practical use.

The VC-1 video codec has an intra prediction mode which operates in the frequency domain, in which the first column and/or first row of AC coefficients in the DCT (Discrete Fourier Transform) domain are predicted from the first column (or first row) of the DCT blocks located immediately to the left or above the processed block. That is to say, coefficients lying at the edge of one block are predicted from the direct spatial neighbours in an adjacent block. For reference see "The VC-1 and H.264 Video Compression Standards for Broadband Video Services", AvHari Kalva, Jae-Beom Lee, pp. 251.

SUMMARY

According to one aspect of the present invention, there is provided a method of compressing a video signal, comprising: receiving a video signal comprising a plurality of video frames, each frame representing an image at a different respective time, and each frame comprising a plurality of constituent blocks of the respective image; for each of a plurality of current blocks to be encoded within a frame of the video signal, selecting a respective reference block, and generating difference data for the current block relative to the respective reference block; and generating an encoded bitstream comprising the difference data together with side information identifying the selected reference blocks, and outputting the bitstream to one of a transmission medium and a storage medium for supply to a decoder; wherein each of said reference blocks is selected by: (i) determining a group of candidate blocks comprising at least some candidate blocks other than immediately adjacent spatial neighbours of the current block; and (ii) selecting one of said candidate blocks as the reference block based on a metric relating to a number of bits that would be required in the encoded bitstream to encode both the difference data and the side information identifying the candidate as the reference block.

In preferred embodiments, step (i) may comprise searching a set of blocks to select a subset of candidate blocks based on a first metric other than spatial proximity to the current block, so as to select a subset comprising at least some candidate blocks other than immediately adjacent spatial neighbours of the current block; and step (ii) may comprise selecting one of said candidate blocks as the reference block based on a second metric, different from the first metric, the second metric relating to a number of bits that would be required in the encoded bitstream to encode both the difference data and the side information identifying the candidate as the reference block.

Rather than using predetermined spatial neighbours for reference in prediction coding, the present invention allows other blocks to become candidates for use as reference blocks. E.g. the present invention may select candidates based on a a similarity of some other property such block energy or structure. This is potentially beneficial, because a non-spatially nearby block may in fact turn out to be a more suitable reference for prediction coding, i.e. may be more similar to the current block and so result in a smaller residual which can be encoded with fewer bits. E.g. a block from the other side of the frame might happen to result in a smaller residual and hence require fewer bits to encode.

However, this means the position of the best candidate also needs to be signalled to the decoder as side information in the bitstream. Because the signalled block could potentially be at any position within a frame, its position may require a relatively large number of bits to encode and so the side information is potentially large.

Therefore according to the present invention, the cost in terms of the number of bits incurred by both the side information and the residual is calculated. When both the cost of the side information and the benefit of the reduced residual are taken into account, the present invention thus provides an improved method of selecting reference blocks for use in prediction coding which advantageously results in a reduced overall bit rate.

Furthermore, in particularly advantageous embodiments, the step (i) may be performed once for a plurality of said reference blocks, such that a plurality of the reference blocks are selected from the same subset of candidate blocks. Reference blocks for both interframe and intraframe prediction may be selected from the same subset of candidates.

There has to date been no technique available which can be used for both inter and intra frames.

In particularly preferred embodiments, the step (i) may comprise searching all the blocks of at least one frame. Therefore the invention preferably uses a full, exhaustive search, meaning that any block in a frame can be a candidate.

In another embodiment, each block comprises a plurality of coefficients, and said difference data may be generated for all the coefficients of the current block based on all the coefficients of the reference block. This is unlike VC-1, which only uses the first row and/or column of coefficients within a block.

In a further embodiment the generation of the encoded bitstream may comprise entropy encoding the difference data and side information. In this case, the present invention provides improved redundancy removal prior to entropy encoding (e.g. prior to Huffman encoding or arithmetic encoding).

In further embodiments, the step (ii) may comprise selecting the candidate block that would require the fewest bits in the encoded bitstream to encode both the difference data and the side information identifying the candidate as the reference block.

The first metric may be a measure of block energy. The step (i) may comprise selecting a subset of candidate blocks based on their block energy relative to that of the current block. Said measure of block energy may comprises one of: a number of zero coefficients in the block, a number of non-zero coefficients in the block, and an average or total of a modulus of coefficients in the block.

The method may comprise, prior to selecting the reference blocks, transforming blocks of one or more frames from a spatial domain representation to a transform domain representation, thereby generating a respective set of transform domain coefficients for each block, wherein the difference data may be generated based on the transform domain coefficients.

The first metric may be evaluated with respect to the transform domain coefficients. The block energy may be evaluated based on the transform domain coefficients.

The step (ii) may comprise sorting a set of blocks including the current block into an order according to the first metric, and selecting a subset of candidate blocks based on proximity to the current block within the ordered set.

The step (ii) may comprise selecting the subset of candidate blocks within a predetermined window of the current block within the ordered set.

The second metric may comprise a bitrate required to encode both the difference data and the side information identifying the candidate as the reference block.

The second metric may relate to the number of bits that would be required in the encoded bitstream for said entropy encoding of the difference data and side information.

The bitrate may be determined by a sum of $\log_2$ of probabilities of a plurality of different possible symbols for representing the difference data and the side information.

The method may comprise quantizing the blocks of each frame prior to said prediction.

For each of a plurality of current blocks to be encoded within a current frame of the video signal, said selection may comprise selecting a respective reference block in the current frame, and the respective difference data may be generated according to an intraframe prediction of the current block by reference to the reference block in the current frame, the selection of each of said reference blocks in the current frame being by steps (i) and (ii).

The step (i) may comprise searching all the blocks of current frame.

For each of a plurality of current blocks to be encoded within a current frame of the video signal, said selection may comprise selecting a respective reference block in a preceding frame, and the respective difference data may be generated according to an interframe prediction of the current block by reference to the reference block in the preceding frame, the selection of each of said reference blocks in the preceding frame being by steps (i) and (ii).

The step (i) may comprise searching all the blocks of the preceding frame.

The side information in the encoded bitstream may identify the preceding frame. The side information in the encoded bitstream may identify each of the selected reference blocks by means of a position relative to a fixed point in a frame, rather than a vector relative to the respective current block.

According to another aspect of the present invention, there is provided a computer program product for compressing a video signal, the computer program product being embodied on a computer-readable medium and comprising code configured so as when executed on a processor to: receive a video signal comprising a plurality of video frames, each frame representing an image at a different respective time, and each frame comprising a plurality of constituent blocks of the respective image; for each of a plurality of current blocks to be encoded within a frame of the video signal, select a respective reference block, and generate difference data for the current block relative to the respective reference block; and generate an encoded bitstream comprising the difference data together with side information identifying the selected reference blocks, and output the bitstream to one of a transmission medium and a storage medium for supply to a decoder; wherein the computer program product is configured to select each of said reference blocks by: (i) determining a group of candidate blocks comprising at least some candidate blocks other than immediately adjacent spatial neighbours of the current block; and (ii) selecting one of said candidate blocks as the reference block based on a metric relating to a number of bits that would be required in the encoded bitstream to encode both the difference data and the side information identifying the candidate as the reference block.

In embodiments, the computer program product may be further configured so as when executed to perform any of the above method features.

According to another aspect of the present invention, there is provided an encoder for compressing a video signal, the video signal comprising a plurality of video frames, each frame representing an image at a different respective time, and each frame comprising a plurality of constituent blocks of the respective image; the encoder comprising: a prediction coding module arranged, for each of a plurality of current blocks to be encoded within a frame of the video signal, to select a respective reference block, and to generate difference data for the current block relative to the reference block; and an output module arranged to generate an encoded bitstream comprising the difference data together with side information identifying the selected reference blocks, and outputting the bitstream to one of a transmission medium and a storage medium for supply to a decoder; wherein the prediction coding module is configured to select each of said reference by: (i) determining a group of candidate blocks comprising at least some candidate blocks other than immediately adjacent spatial neighbours of the current block; and (ii) selecting one of said candidate blocks as the reference block based on a metric relating to a number of bits that would be required in the encoded bitstream to encode both the difference data and the side information identifying the candidate as the reference block.

In embodiments, the encoder may be further configured in accordance with any of the above method features.

According to further aspects of the present invention, there may be provided a corresponding bitstream embodied on a physical medium such as a transmission medium of a network equipment or a storage medium. There may also be provided a corresponding decoder and decoder program product.

BRIEF DESCRIPTION OF THE DRAWINGS

For a better understanding of the present invention and to show how the same may be carried into effect, reference will now be made by way of example, to the accompanying drawings, in which:

FIG. 1 is a schematic illustration of two frames of a video stream,

FIG. 1a shows the pixel values of blocks represented in the spatial domain,

FIG. 1b shows coefficients of blocks represented in the frequency domain,

DETAILED DESCRIPTION

In the following there is described a method and system for data compression in a video transmission system.

FIG. 1 schematically illustrates two successive frames $f_t$ and $f_{t+1}$ of a video image at two respective moments in time t and t+1. For the purpose of inter frame prediction the first frame $f_t$ may be considered a reference frame, i.e. a frame which has just been encoded from a moving sequence at the encoder, or a frame which has just been decoded at the decoder. The second frame $f_{t+1}$ may be considered a target frame, i.e. the current frame whose motion is sought to be estimated for the purpose of encoding or decoding. An example with two moving objects is shown for the sake of illustration.

Motion estimation is itself known in the art and so is described herein only to the extent necessary to provide suitable background for the present invention. According to International Standards for Video Communications such as MPEG 1, 2 & 4 and H.261, H.263 & H.264, motion estimation is based on block-based partitions of source frames. For example, each block may comprise an array of 4×4 pixels, or 4×8, 8×4, 8×8, 16×8, 8×16 or 16×16 in various other standards. An exemplary block is denoted by $B_i$ in FIG. 1. The number of pixels per block can be selected in accordance with the required accuracy and decode rates. Each pixel can be represented in a number of different ways depending on the protocol adopted in accordance with the standards. In the example herein, each pixel is represented by chrominance (U and V) and luminance (Y) values (though other possible colour-space representations are also known in the art). In this particular example chrominance values are shared by four pixels in a block. A macroblock $MB_i$ typically comprises four blocks, e.g. an array of 8×8 pixels for 4×4 blocks or an array of 16×16 pixels for 8×8 blocks. Each pixel has an associated bit rate which is the amount of data needed to transmit information about that pixel.

Figure 2:
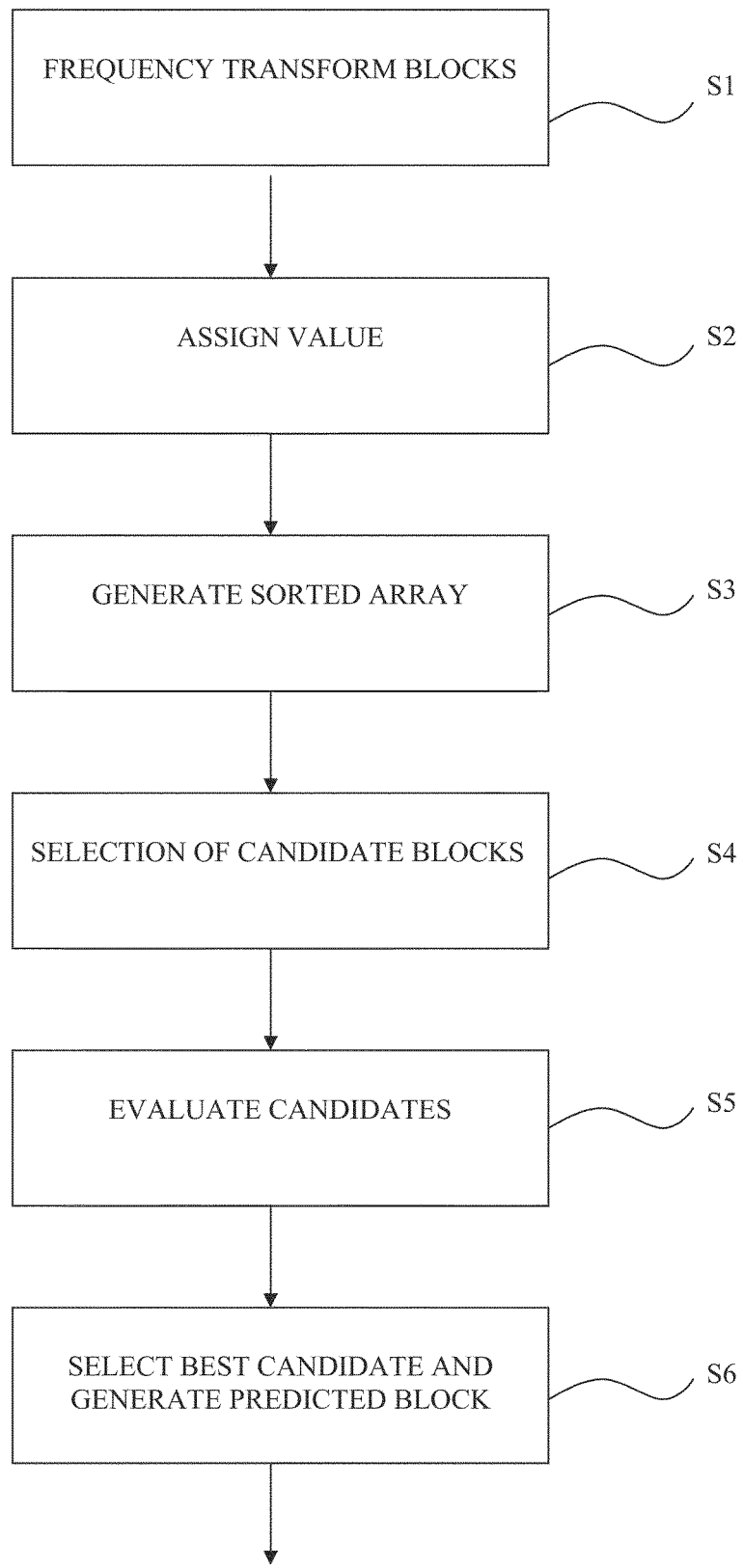
FIG. 2 is a flow diagram showing an encoding method.

FIG. 2 is a schematic flow chart of a data compression method in accordance with a preferred embodiment of the present invention. The method preferably uses block matching based on objective metrics. That is, one or more metrics of a current target block to be encoded are compared to the corresponding metrics of a plurality of other blocks, and a reference block is selected based on a measure of similarity of those metrics. The reference block then forms the basis for encoding the current block by means of prediction coding, either intra-frame coding in the case where the reference clock is from the same frame $f_{t+1}$ or inter-frame coding where the reference block is from a preceding frame $f_t$ (or indeed $f_{t-1}$, or $f_{t-2}$, etc.). The idea behind the block matching is to choose a reference block which will result in a small residual signal when the current block is encoded relative to that reference block (i.e. so that the difference between the actual current block and the prediction will be small when predicted from the selected reference block), hence requiring only a small number of bits to encode.

It is a particularly preferred aspect of the technique that block matching is carried out in the frequency domain, i.e. based on comparison of one or more metrics of a transformed representation of the blocks.

Hence at step S1, a frequency domain transform is performed on each portion of the image of each of a plurality of frames, e.g. on each block. Each block is initially expressed as a spatial domain representation whereby the chrominance and luminance of the block are represented as functions of spatial x and y coordinates, U(x,y), V(x,y) and Y(x,y) (or other suitable colour-space representation). That is, each block is represented by a set of pixel values at different spatial x and y coordinates. A mathematical transform is then applied to each block to transform into a transform domain representation whereby the chrominance and luminance of the block (or such like) are represented as a function of variables such as wavenumbers $k_x$ and $k_y$ having dimensions of 1/wavelength, i.e. $U(k_x, k_y)$, $V(k_x, k_y)$ and $Y(k_x, k_y)$. That is, the block is transformed to a set of coefficients representing the amplitudes of different spatial frequency terms which can be considered to make up the block. Possibilities for such transforms include the Discrete Cosine transform (DCT), Karhunen-LoeveTransform (KLT), or others. E.g. for a block of N×M pixels at discrete x and y coordinates within the block, a DCT would transform the luminance Y(x,y) to a set of frequency domain coefficients $Y(k_x, k_y)$:

$$Y(k_x, k_y) = \sum_{x=0}^{N-1} \sum_{y=0}^{M-1} Y(x, y) \cos\left[\frac{\pi k_x}{2N}(2x+1)\right] \cos\left[\frac{\pi k_y}{2M}(2y+1)\right]$$

And inversely, the x and y representation Y(x,y) can be determined from a sum of the frequency domain terms summed over $k_x$ and $k_y$. Hence each block can be represented as a sum of one or more different spatial frequency terms having respective amplitude coefficients $Y(k_x, k_y)$ (and similarly for U and V). The transform domain may be referred to as the frequency domain (in this case referring to spatial frequency).

In some embodiments of the invention, the transform could be applied in three dimensions. A short sequence of frames effectively form a three dimensional cube or cuboid $U(x,y,t)$, $V(x,y,t)$ and $Y(x,y,t)$. In the case of a three dimensional transform, the these would transform to $U(k_x, k_y, f)$, $V(k_x, k_y, f)$ and $Y(k_x, k_y, f)$. The term "frequency domain" may be used herein may be used to refer to any transform domain representation in terms of spatial frequency (1/wavelength domain) transformed from a spatial domain and/or temporal frequency (1/time period domain) transformed from a temporal domain.

Once the blocks are transformed into the frequency domain, block matching is performed by comparing the transformed frequency domain coefficients of the current block to those of a plurality of other blocks. A reference block for prediction coding of the current block (either intra or inter) can then be selected based on a measure of block similarity determined from the frequency domain coefficients.

An advantage of block-matching in the frequency domain is that the transform tends to compact the energy of a block into only a few non-zero (or non-negligible) coefficients, and thus that comparison can now be based only on only a few frequency coefficients instead of all the coefficients ion the block. That is, since the frequency transform concentrates the energy into only a few significant coefficients, then efficient block matching (or indeed other processing) can be performed by only considering those few significant coefficients. This technique thus provides a unique approach to the problem of data compression in video transmission. Although not every pixel need be directly compared when comparing patterns, nevertheless, a complete search can be achieved.

For example consider an illustrative case as shown in FIGS. 1a and 1b. Here, the representation of a block in the frequency domain is achieved through a transform which converts the spatial domain pixel values to spatial frequencies. FIG. 1a shows some example pixel values of four 8×8 blocks in the spatial domain, e.g. which may comprise the luminance values $Y(x,y)$ of individual pixels at the different pixel locations x and y within the block. FIG. 1b is the equivalent in the frequency domain after transform and quantization. E.g. in FIG. 1b such coefficients may represent the amplitudes $Y(k_x, k_y)$ of the different possible frequency domain terms that may appear in the sum. The size of the block in spatial and frequency domain is the same, i.e. in this case 8×8 values or coefficients. However, due to the properties of these transforms then the energy of the block is compacted into only few coefficients in the frequency domain, so the entire block can be considered by processing only these few coefficients.

As can be seen from this example, only four values need to be processed to find a match for these four blocks in the frequency domain, whereas in the spatial domain there are 256 values that would need to be processed. Thus unlike prior techniques, the present invention may allow a full true search to be performed but without the need to "touch" every pixel in the block, i.e. without the need to process each individual pixel.

It will be appreciated that while blocks and macroblocks are referred to herein, the techniques can similarly be used on other portions definable in the image. Frequency domain separation in blocks and/or portions may be dependent on the choice of transform. In the case of block transforms, for example, like the Discrete Cosine transform (DCT) and Karhunen-Loeve Transform (KLT) and others, the target block or portions becomes an array of fixed or variable dimensions. Each array comprises a set of transformed quantized coefficients. E.g. in the more detailed example of FIG. 5A, each macroblock MB of 16×16 pixels may be represented in the frequency domain by 16 luminance blocks and 8 chrominance blocks; each block b0 . . . b23 having a 4×4 array of quantized coefficients.

According to another preferred aspect of the present invention, block matching may be performed within a sorted list based on an index value reflecting the relative importance of the block. In this case the selection of matching blocks may be performed based on an aggregate of values used for the importance indexing. A preferred example will now be described with reference to steps S2 to S6 of FIG. 2 and the example blocks of FIG. 5A.

At Step S2, each block b0 . . . b23 in the frequency domain is assigned an index value derived from one or more of its frequency domain coefficients. For example, the index value may represent the energy of the block. E.g. this may comprise an aggregate over the coefficients of the block, such as a number of zero coefficients, number of non-zero coefficients, or an average or total value of the moduli of the coefficients in each block.

At Step S3, the blocks from at least one frame are then sorted based on the index value. This may involve generating a sorted list in which the entries represent blocks ordered according to their index values, e.g. their block energies.

Figure 3:
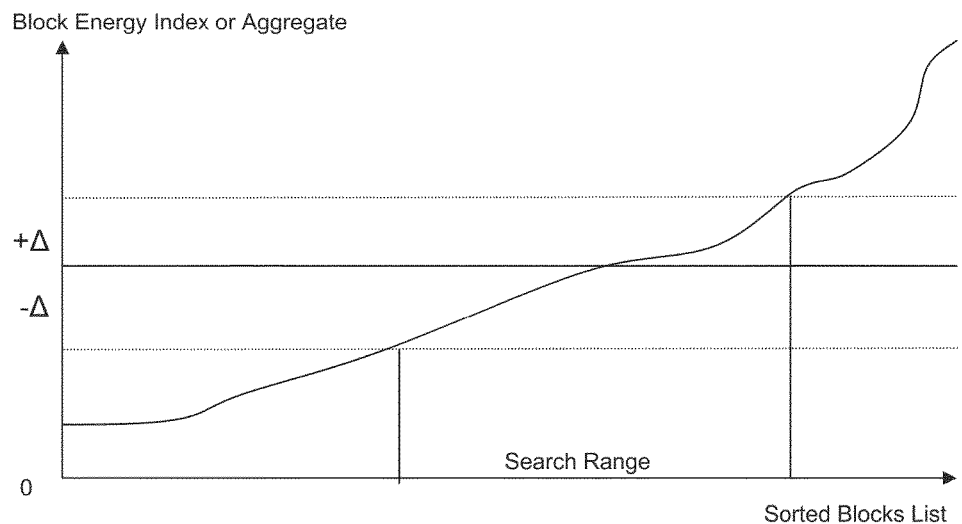
FIG. 3 is a graph showing a sorted block list.

At Step S4, a subset of candidate blocks is identified from the sorted array by determining a search range or threshold $\Delta$ based on the index values. The candidate blocks will be potential matches as reference blocks for use in prediction coding of a current block to be encoded. This is illustrated in FIG. 3. For example this may be achieved by determining an energy range $+/-\Delta$ from the current block to be encoded, and determining that all blocks within that range of the current block are candidates for potential selection as a reference block (i.e. candidates for a "match" to the current block for the purpose of prediction coding).

At Step S5, the candidate blocks are then evaluated for similarity. For example, block similarity is preferably determined based on bit rate, where the bit rate is a measure of the number of bits that would need to be transmitted in order to define the residuals for the current block if predicted from each candidate block. An example of this will be discussed in more detail shortly.

At Step S6, the best matching candidate is determined based on its similarity, and the current target block is encoded relative to that matching candidate. The encoding comprises subtracting the frequency domain coefficients of the reference block from those of the current block in order to generate a residual signal, and then encoding the residual of the current block into the encoded bitstream along with the identity of the respective selected reference block (instead of encoding the target block's actual absolute coefficients). The reference block is thus used as a prediction of the current block. The residual is the difference between the frequency domain coefficients of the current block and the frequency domain coefficients of the reference block, which requires fewer bits to encode and so the encoding results in a compressed video signal. The best candidate for use as the reference block is preferably selected by calculating the bit rate that would be required to transmit the residuals for the current block based on the candidate plus overhead information identifying the candidate block, in comparison with the bit rate that would be required for other such candidates.

It will be readily appreciated that a match does not imply identical blocks, but blocks that are sufficiently similar that residuals can be transmitted at a lower bit rate.

FIG. 3 is a graph illustrating the arrangement of a sorted array. The list of sorted blocks is shown on the horizontal axis, with block energy index value on the vertical axis. The block energy index value is an example of an objective metric derived form the block's coefficients.

As described above, a best matching reference block is selected having an index within a certain search range or threshold $\Delta$. Thus according to one preferred aspect, the invention provides a method of searching amongst the blocks for matches based on similarity of their indices. By searching for matches by their energy index or such like, this advantageously expands the potential for matches to anywhere within the frame or another frame. Hence the matching need not be restricted to adjacent regions of the target block. For instance, blocks having similar energies may achieve a good even if located on opposite sides of a frame, e.g. blocks of a similar background area appearing at different locations in the frame.

According to another preferred aspect of the invention, block matching is performed by first selecting a subset of candidate blocks based on a first metric (e.g. the index value), and then selecting a matching candidate block from within the subset based on a second metric (e.g. bitrate cost). The matching block is then used as a reference block in prediction coding of a current block to be encoded. One advantage of narrowing the possible matches down to a preliminary subset of candidates based on a first metric, particularly based on an aggregate metric such as block energy, is that unlikely candidates can be eliminated early on without incurring significant processing burden. That is, the sort may be used to discard unlikely candidates. Thus the more processor-intensive comparison based on the second metric, such as the bit rate comparison, need only be performed for a relatively small number of pre-vetted candidates, thus reducing the processing burden incurred by the block matching algorithm. E.g. blocks with very different block energies are unlikely to be good matches and therefore it is unlikely to be worth the processing cost of comparing their potential bitrate contributions. To minimize processing, the selection of a matching block in Step S6 is preferably performed within a small neighbourhood within the list (search range +/-$\Delta$).

Note though that the sort only gives a certain probability of a match and may be chosen depending on performance considerations. A smaller choice of $\Delta$ results in a lower processing cost but fewer candidates, risking not find the best possible match. A larger choice of $\Delta$ on the other hand incurs a higher processing cost but will include more candidates and so have a better chance of finding the best match. In embodiments, $\Delta$ could even be adapted dynamically based on one or more performance factors such as available up or downlink bandwidth or available processing resources. Note also that the same value of $\Delta$ need not necessarily be use in the +$\Delta$ direction as in the -$\Delta$ direction.

Figure 5A:
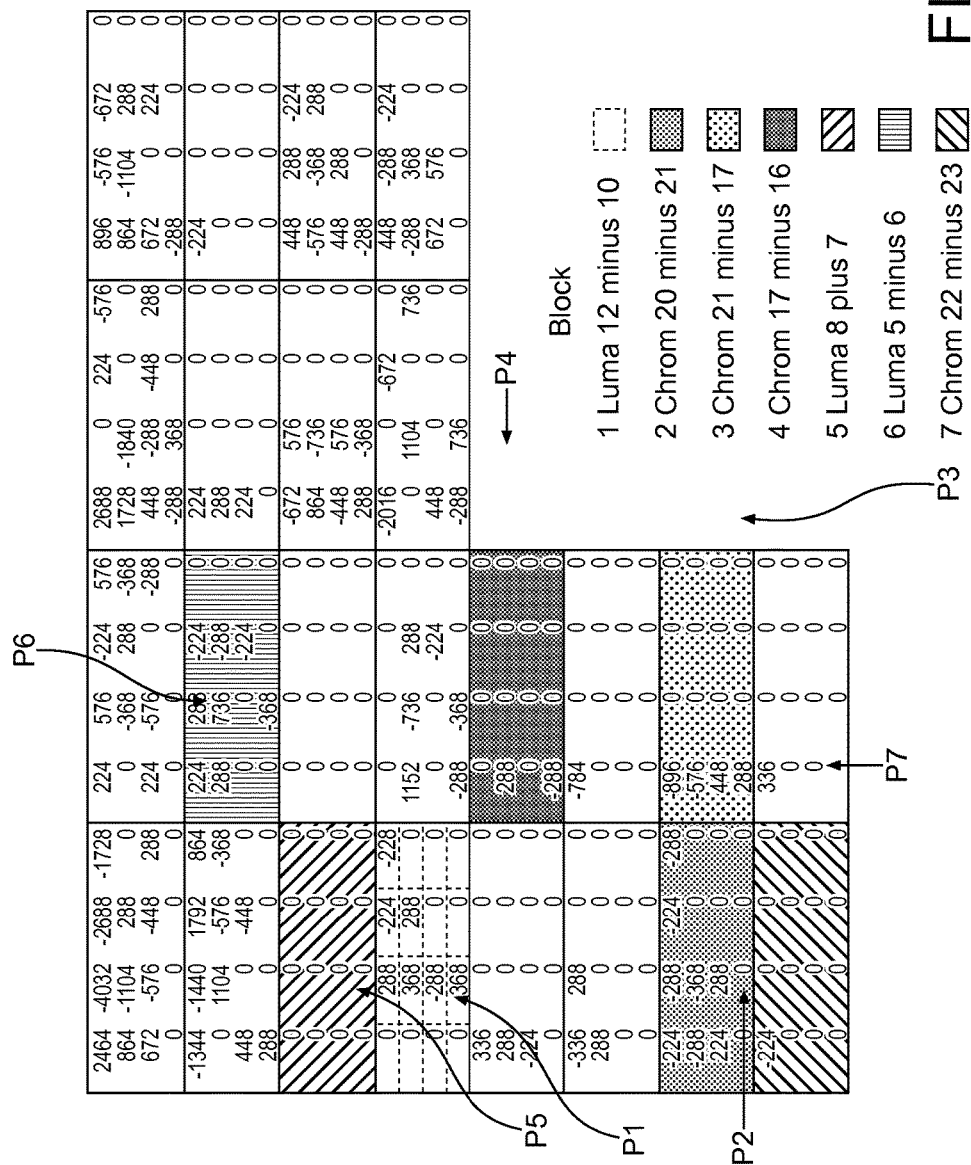
FIG. 5A is a schematic example of an intra frame prediction.

It will be appreciated that at Step S3, the sorted array can be generated for a macroblock (as shown in the example of FIG. 5A), for a single frame (for intra frame data compression) or for a current target frame and one or more reference frames (for inter frame motion estimation).

In one particularly advantageous embodiment, the same sorted list is used to match multiple target blocks (by determining respective subsets of candidates within the same list). Further, if the list contains blocks from both the current frame and one or more preceding frames, then the same list can even be used for both inter and intra matching within the same sorted list. E.g. when processing a particular target frame it may be that a good match may is not found within that frame, in which case the method may look to other frames since the complexity is low and the matching method is the same. According to preferred embodiments of the present invention, there is no need to use a different method for finding inter frame matches between frames than is used for intra matching within a frame.

By replacing an exhaustive, repetitive search performed for every block with a single sort that is performed once for an entire frame or even multiple frames, the selection of a matching block can be performed in a small neighbourhood using the sorted list. Preferably the sort is performed once for multiple frames, so that both inter and intra matches can be processed at the same stage over the same sorted list. E.g. this may involve looking for a match within the sorted list of the current frame and, if no satisfactory match is found, looking into the sorted lists of one or more other frames to find a better match.

The above-described aspect of the present invention thus provides a method of compressing video data which can be applicable both to intra frame compression and to inter frame motion estimation. In the past, algorithms have adopted different approaches to inter versus intra data compression. The invention on the other hand can advantageously provide a unified technique used for both intra and inter frame prediction.

Another benefit of the method is that due to its low complexity, the number of used reference frames can be substantially higher in comparison with existing algorithms.

Furthermore, note that conventional motion estimation predicts each block from an area offset by any arbitrary number of pixels or even fractional number of pixels in the horizontal or vertical direction, whereas the approach used in the present invention differs by restricting the prediction to performing only block-to-block matching. That is, matching on a block-by-block basis whereby a block is matched to another whole block (rather than any arbitrarily offset area requiring a motion vector specifying any number of pixels or fractional number of pixels). In a particularly advantageous combination of features, the block-to-block matching may be performed in the frequency domain where efficiency can be derived by predicting only a subset of frequency domain coefficients between two or more blocks.

Once a matching block has been selected at step S6 and the current target block has been encoded relative to that matching block, the residual of the frequency domain coefficients is output via an entropy encoder for inclusion in the encoded bitstream. In addition, side information is included in the bitstream in order to identify the reference block from which each encoded block is to be predicted at the decoder. Each block may be identified by its location, i.e. by its address or position within a particular frame. Each frame may be identified by a frame number. Because of the above distinction, note that the side information identifying the selected reference block may be signaled in the bitstream in the form of a block address identifying the location of the reference block in terms of a whole number of blocks. This may take the form of an absolute block address, i.e. a position relative to a fixed point in the frame. Alternatively it may take the form of a relative address. The side information may also identify the frame of the selected reference block if candidates may be selected from a plurality of different potential frames.

This is different from a conventional motion vector, which is signaled in the form of a small vector relative to the current block, the vector being any number of pixels or factional pixels.

As mentioned, the VC-1 video codec has an intra prediction mode in which the first column and/or first row of AC coefficients in the DCT domain are predicted from the first column (or first row) of the DCT blocks located immediately to the left or on the top of the processed block. However, this differs from the approach used in aspects of the present invention in that it is restricted to using only predetermined spatially-adjacent coefficients for intra prediction. VC-1 does not allow intra matching to a selected reference block, e.g. selected based on block energy and/or bitrate contribution (and therefore VC-1 also does involve signaling the identity of a selected reference block to the decoder).

Figure 4:
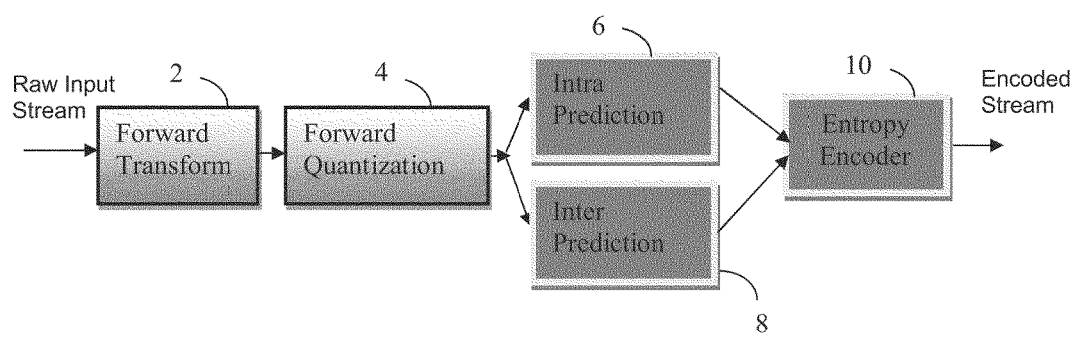
FIG. 4 is a schematic block diagram of an encoder.

FIG. 4 is a schematic block diagram showing the architecture of an encoding technique in accordance with one embodiment of the invention. The raw input video stream is received by a forward transform stage 2. The output of this stage is supplied to a forward quantization stage 4. The forward transform stage 2 applies spatial or spatial-temporal transform into the frequency domain as a first coding step. The forward quantization stage 2 applies quantization and generates for each block a set of quantized coefficients in the frequency domain. The transform coefficients from the forward quantization stage 2 of each intra frame in the temporal domain of the input video stream are supplied to an intra prediction stage 6.

The intra prediction stage 6 operates to locate candidate blocks for prediction within each frame, using the method described above. The transform coefficients of inter frames are supplied from the forward quantization stage 4 to an inter-prediction stage 8, which separates the candidate blocks for prediction of target frames as described above. The outputs of the intra prediction stage and the inter-prediction stage 8 are supplied to an entropy encoder 10 which encodes the data to provide an encoded stream for transmission. The encoded stream contains a sequence of information comprising, for each block, a set of coefficients (actual or residual), data defining whether the block is to be predicted and, if it is, an indication of the reference block from which it is to be predicted. The identity of the reference block may be represented in the encoded bitstream as an absolute block location within a frame, i.e. by reference to a fixed point, and not relative to the current block. Alternatively the location may be represented in the encoded bitstream as a difference between the location of the current block and the block from which it is predicted. Either way, the block location is expressed in terms of a number of intervals of whole blocks, i.e. as a block address, and so a benefit is achieved because this requires far less overhead to encode than a conventional motion vector expressing an offset in pixels or even fractions of pixels.

Figure 7:
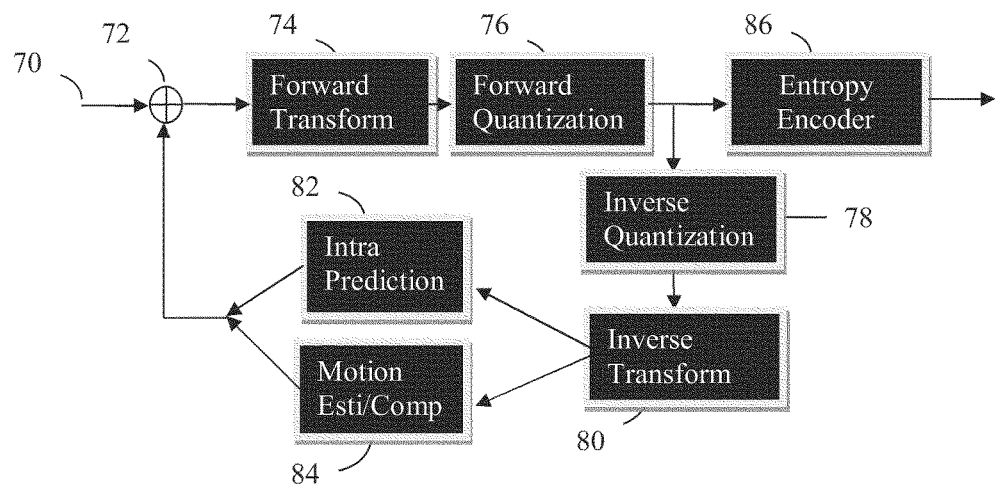
FIG. 7 is a schematic block diagram of an encoder.
Figure 8:
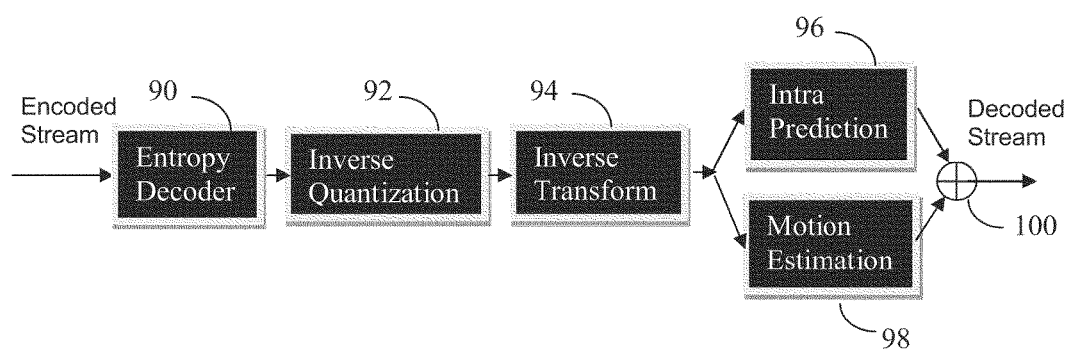
FIG. 8 is a schematic block diagram of a decoder.

Note that the arrangement does not involve a loop back into the spatial domain as in the standard encoder of FIG. 7. Hence block matching is performed in the transformed frequency domain based on frequency domain coefficients.

Note also that in preferred embodiments, the selection of the reference block is performed in the quantized domain, i.e. a non-distorting, lossless environment. Therefore no additional distortion is applied to the candidate blocks or current blocks before performing the selection.

FIG. 5A illustrates schematically a prediction example. The case illustrated in FIG. 5A is where the technique is used for intra prediction between different blocks of the same macroblock in one frame. FIG. 5A illustrates on the left hand side luminance and chrominance data transformed into the frequency domain for a macroblock (16×16 pixels). The frequency transformed coefficients are organised into blocks b0, b1, etc, each block comprising a 4×4 array of coefficients. Blocks b0 to b15 represent luminance data (y) for the macroblock, and blocks b16 to b23 represent chrominance data (u,v) for the macroblock.

There are different schemes for treating the luma and chroma channels. A common way is the 4:2:0 format which implies that the chroma channels are being downsampled by a factor two in both the horizontal and in the vertical direction.

In the example shown, block b0 contains 16 coefficients: one DC (the first one at coordinate 0,0) and 15 AC coefficients (the rest of the block). The DC represents the so-called "constant" value of luminance (for 'Y' blocks) and of the chrominance (for 'U' and 'V' blocks), and the ACs form the variable part meaning their contribution for each pixel is different. The combination of the DC and all ACs are used to represent the value of each pixel after decoding based on the used transform. The 16×16 luma frequency domain coefficients 'Y' are fully utilized to represent 16×16 spatial domain pixels. In the explanation above, the chrominance 'Us' are sub-sampled. This format is known as YUV 4:2:0, which means that four luminance pixels for each 2×2 square of the Y pixels share one 'U' and one 'V' pixel respectively.

There also exist other formats known as YUV 4:2:2 or YUV 4:4:4, in which the chrominance is not sub-sampled at all in YUV 4:4:4, or where the chrominance has twice as much data in 4:2:2. The present invention can work for any of these formats.

Figure 3A:
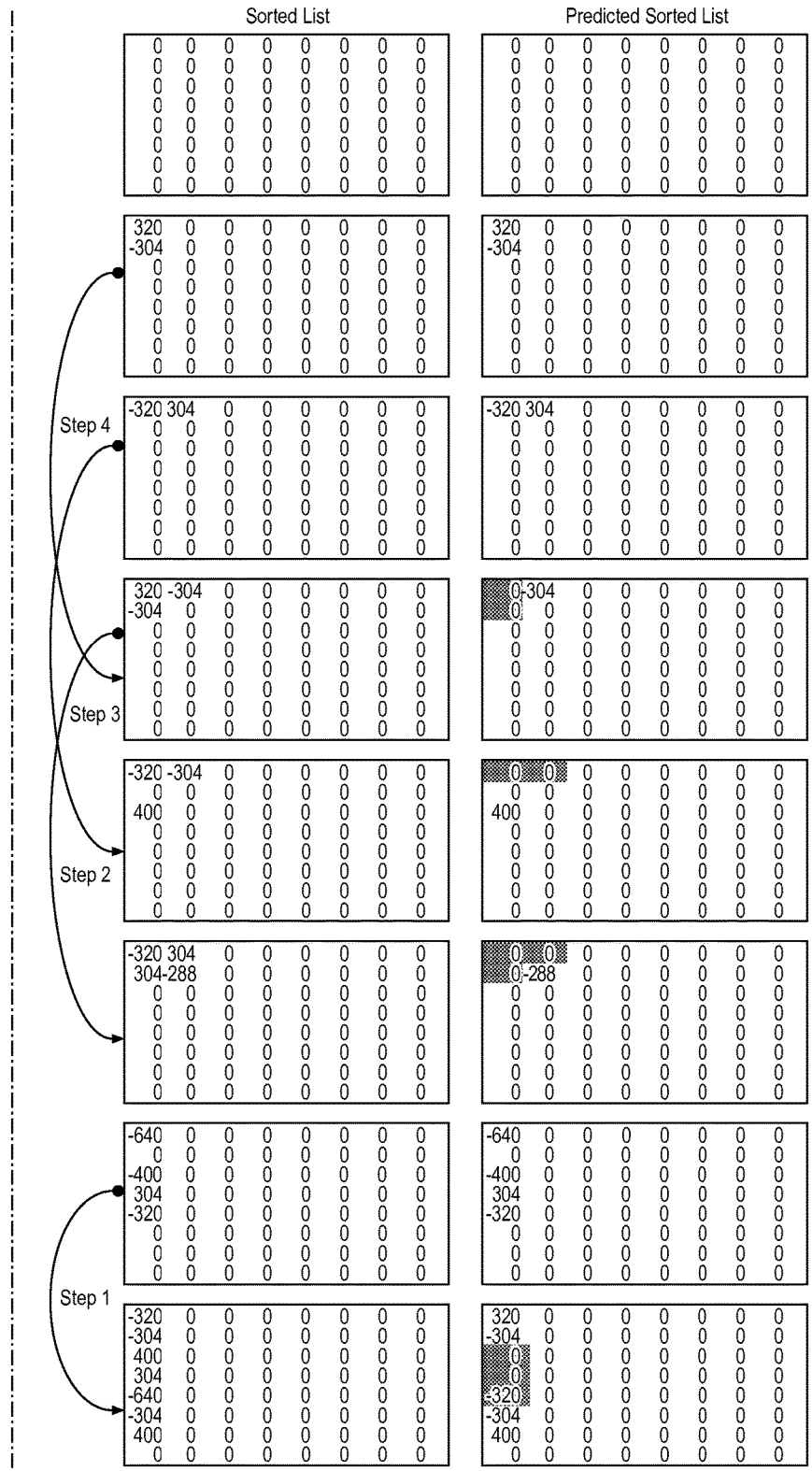
FIG. 3a illustrates an example of block-sorting.

In the described example, the blocks b0 to b23 for the macroblock are sorted based on a measure (index value) of block energy or activity. FIG. 3a illustrates an example of block-sorting. The block energy used to order the sort can be measured in a number of different ways. According to one technique, the sort is based on the number of zero value coefficients in a block. In another technique, the sort is carried out using the average value of the modulus of non zero coefficients. Using a measure Δ of block energy, a search range is established within the sorted list as illustrated in FIG. 3 to identify candidate blocks (Step S4 of FIG. 2). The best candidate for prediction is then established as described above based on bit rate evaluation (Step S6 of FIG. 2).

The right hand diagram in FIG. 5A illustrates the effect of these predictions. Block b12 is labelled P1 to denote it as the first predicted block. Instead of transmitting the actual coefficients in block b12, coefficients (residuals) representing the differential between block b12 and b10 are transmitted, together with the information that in the transmitted data block 12 has been predicted from reference block 10. An indication of the reference block 10 is also transmitted, e.g. identified by its frame number and position in the frame. This is shown schematically in the list on the right hand side of FIG. 5A where P1 denotes prediction 1, block 12 minus block b10 in the lama block. The next candidate to be selected is block 20 labelled P2 which is predicted from block b21. The process continues and in this case results in 7 predicted blocks. This results in a reduction in the number of coefficients to be transmitted by 9 (from 132 to 123). In a specific example, when the video data is encoded for transmission in bins, this has the effect that bins 122 and 1008 are removed, while the content of bins 224 and 288 are increased. In FIG. 5A, the arrows denote the relationship between a predicted block and the block from which it is being predicted.

Figures 5B, 6:
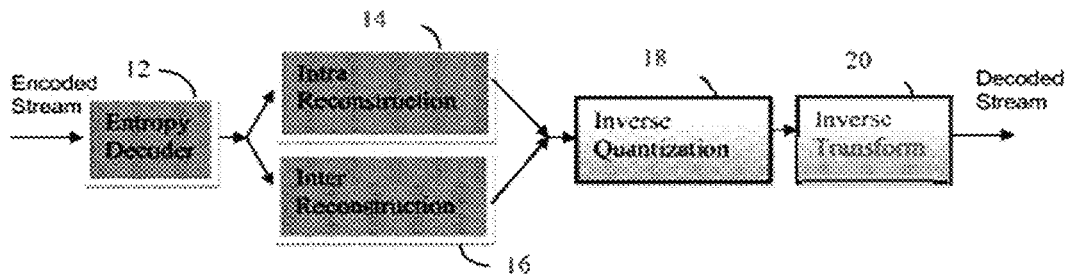
FIG. 5B is a schematic example of an inter frame prediction.
FIG. 6 is a schematic diagram of a decoder.

FIG. 5B shows a prediction example for motion prediction between different blocks of different macroblocks of two frames.

FIG. 6 is a schematic block diagram of a decoder for decoding a video stream which has been subject to the block prediction technique described above. In addition to the encoded coefficients, the video stream includes data defining the predicted blocks, the identity of the blocks from which they have been predicted and the order in which they have been predicted. The encoded stream is supplied to an entropy decoder 12 which deter mines for the incoming data whether the blocks to be decoded are for reconstruction of an intra frame or reconstruction of an inter frame. Blocks for reconstruction of an intra frame are passed to intra reconstruction stage 14, while blocks intended for reconstruction of an inter frame are passed to inter reconstruction stage 16. A predicted block is reconstructed by adding the residuals to the correspondingly located coefficients in the block it is predicted from. The output of the reconstruction stages 14 and 16 are supplied to an inverse quantization stage 18 and then to an inverse transform stage 20 where the quantization coefficients are transformed from the frequency domain into the time domain as a decoded stream.

Details of a preferred technique for matching blocks based on bitrate contribution are now discussed in more detail. This technique decreases the bitrate in video compression by means of block prediction in the quantized domain. The input to the method is e.g. a slice or a set of slices of blocks of transformed and quantized coefficients (e.g. residuals from the H.264). A slice means a group of macroblocks, so one slice per frame means all macroblocks in the frame belong to the slice. For each transformed and quantized block in the current slice a block from previous encoded slices or a block in the current slice (care has then to be taken to ensure a decodable stream) is a potential candidate to be used for prediction in order to reduce the bitrate (compared to direct entropy coding of the block itself). An example embodiment of a predictor and the "optimal" selection of the block to be used for prediction and required side-information to identify that block (needed description for reconstruction in the decoder) is described below. The side information is entropy encoded into the encoded bitstream along with the residual, by entropy encoder 10.

In the preferred embodiments, the present invention performs block matching using two classes of metrics: one based on an aggregate or pattern of the block (e.g. energy, structure etc.) and a second based on bit rate. These two metrics are used in two separate stages: the first stage to sort and the second stage for the RD loop. In particularly preferred embodiments, the RD loop rate target is not only to find two blocks that can predict each other closely in terms of rate, but also to solve this problem for groups of blocks at the same time. One simple example could be the following patterns—(a) 1,2,1,2,1,2,1,2 and (b) 46,47, 46,47, 46,47, 46,47, that will result in (a) 1,2,1,2,1,2,1,2 and (b) 45, 45, 45, 45, 45, 45, 45, 45. That is to say, multiple blocks can be matched from the same sorted list of candidate blocks, including potentially both interframe and intraframe prediction being performed based on the same sorted list.

The advantages are improved entropy coding due to improved redundancy removal prior to an arithmetic or Huffman coder in the entropy encoder 10. Compared to VC-1 [1, pp. 251] there are a number of potential advantages: (i) all coefficients in the block are used in the prediction and not just the first row and/or column; (ii) all blocks in the frame/slice as candidate blocks for prediction and not just block to the left or on the top; (iii) generalized prediction structures, e.g. weighted prediction or prediction from multiple blocks; and (iv) explicit rate estimation for finding the best block for prediction (taking the cost for side information into account).

Let $X(m,n)$ denote a block $m \in M$ (a frame/slice consists of M blocks in total) of quantized coefficients (e.g. quantized DCT coefficients) at time-instance n. The blocks are conventionally fed to an entropy coder 10 (in H.264 more specifically the context adaptive variable length coder or the context adaptive binary arithmetic coder). That is, from the point where we have $X(m,n)$, lossless compression is performed, i.e., the distortion is fixed. The method seeks to remove remaining redundancies (and thereby reduce the rate) prior to the arithmetic coder by means of a predictor. In one embodiment the prediction is formed as a subtraction between a current block and a reference block. The optimal indices ($o_{opt}, p_{opt}$) for prediction of the current block $X(m,n)$ is selected based on rate calculation/estimation, i.e., $$(o_{opt}, p_{opt}) = \mathrm{argmin}_{o,p}(R(X(m,n)-X(o,p))+R(p))  \quad [1]$$

where $R(X(m,n)-X(o,p))$ denotes the bitrate of the prediction residual and $R(o,p)$ the bitrate of side-information (i.e., the bitrate for transmission of the prediction block index o of frame p). The rate estimation can for instance be provided from parts of the arithmetic coding routine where the sum of $\log_2$ of the symbol probabilities can be used to estimate the rate. It could also be beneficial, from e.g. a computational aspect, to approximate the criterion in equation [1] by using another measure that correlates well with the rate. Generally, any metric can be used that relates in some way to a number of bits that would be required in the encoded bitstream to encode both the residual block and the side information identifying the respective reference block (i.e. would be required for each candidate if that candidate was chosen as the reference block), whether the metric is a direct measure the number or rate of bits or a metric that correlates with the number/rate.

The search for the optimal predictor can be made computationally more efficient by pre-ordering the candidates such that potential good candidates are located in the proximity of a specific position in an ordered array. Let $Y(k,n)$ now denote element k in an M dimensional ordered array of the block indices $m \in M$ of frame n according to some measure. For instance, the blocks $X(m,n)_m \in M$ can be ordered according to their ascending energy (or some other signal dependent properties).

To find the predictors we start e.g. with the first block in the current frame/slice in the raster-scan order (or some other order beneficial from either a rate or computational complexity point of view) and find its position in the ordered array $Y(n)$ of the current frame and the (re-)ordered arrays of the previously processed frames $Y(n-\mathrm{NumRef}), \ldots, Y(n-1)$, NumRef is the number of reference frames, i.e. here the number of previous quantized frames that have been processed and can be used for inter prediction. As prediction candidates from the current frame/slice we select the candidates that are located within the range $+/-W$ around the current index in the ordered array, i.e., the "intra" prediction candidates plugged into expression (1) are the blocks corresponding to the sorted indices $Y(q(n)-W, n), \ldots, Y(q(n)-1, n);$ and $Y(q(n)+1, n), \ldots, Y(q(n)+W, n);$ where q denotes the position of the current block in the ordered array. Note that special caution has to be taken to avoid cyclic predictions, i.e., avoid prediction of block in from block n if block n has already been predicted from block m, making decoding infeasible. It should also be mentioned that direct encoding (i.e., no prediction) of the residual is also included as a candidate for the rate estimation.

Similar to the selection of candidates for intra prediction, the inter prediction candidates are selected as Y(q(n−i)−W, n−i), . . . , Y(q(n−i)+W, n−i)$_{i=1: NumRef}$.

All intra and inter candidates are evaluated according to equation (1) and the optimal index pair is selected. This procedure is repeated for all blocks in the frame/slice. The resulting prediction residuals (variable/index differences) together with required side-information for decoding is e.g. arithmetically encoded and sent to decoder.

Figure 10:
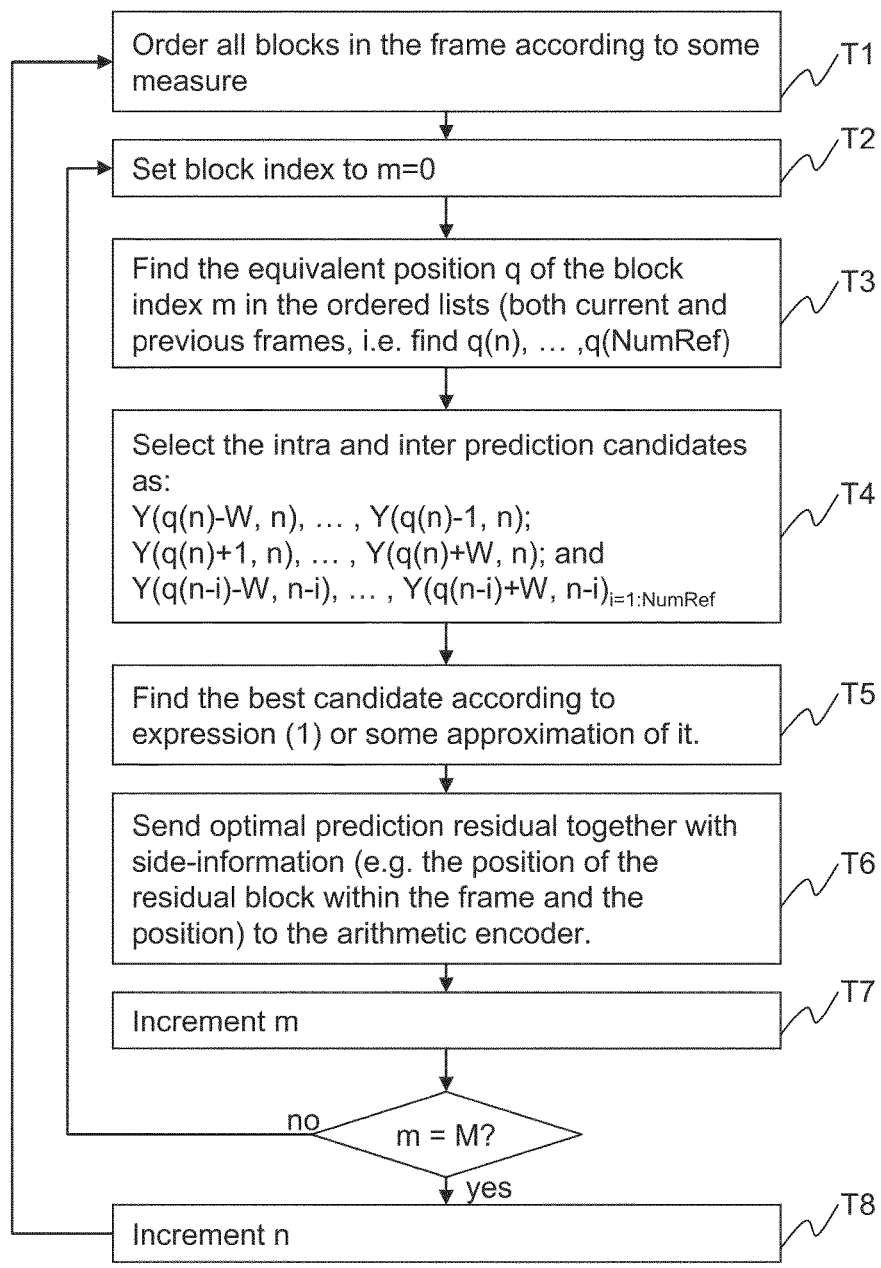
FIG. 10 is a flow chart of an encoding method.

Referring to FIG. 10 one embodiment of the method performed by the encoder is as follows.

Step T1: order all the blocks in the frame according to some measure.
Step T2: set block index to m=0.
Step T3: find the equivalent position q of the block index in in the ordered lists (both current and previous quantized frames, i.e., find q(n), . . . , q(n−NumRef)).
Step T4: select the intra and inter prediction candidates as $Y(q(n)-W,n), \ldots ,Y(q(n)-1,n);$ $Y(q(n)+1,n), \ldots ,Y(q(n)+W,n);$ and $Y(q(n-i)-W,n-i), \ldots Y(q(n-i)+W,n-i)_{i=1: NumRef}$
respectively.

The size of the search range W is a trade-off between performance and computational complexity.
Step T5: find the best candidate according to expression [1] or some approximation of it.
Step T6: send optimal prediction residual together with side-information (e.g. the position of the residual block within the frame and the position (e.g. space and time) of the block that was used for prediction) to the arithmetic coder.
Step T7: increment block index m=m+1 and go to step T3, until m=M when the method moves to the next frame n=n+1.

Figure 11:
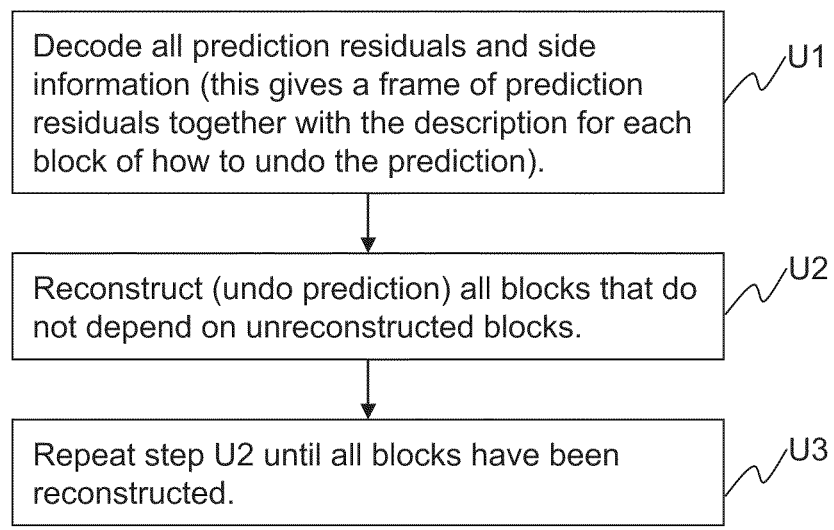
FIG. 11 is a flow chart of a decoding method.

Referring to FIG. 11, one embodiment of the method performed by the decoder is as follows.
Step U1: decode all prediction residuals and side information (this gives a frame of prediction residuals together with the description for each block how to undo the prediction).
Step U2: reconstruct all blocks that do not depend on unreconstructed blocks (i.e. (undo prediction).
Step U3: repeat step U2 until all blocks have been reconstructed.

The above example embodiment can be extended in several ways. For instance it could be beneficial to use weighted prediction or prediction from multiple blocks. Additional side information would be needed to be transmitted which for weighted prediction and prediction using multiple blocks would be prediction weights and block positions/addresses.

Figure 9:
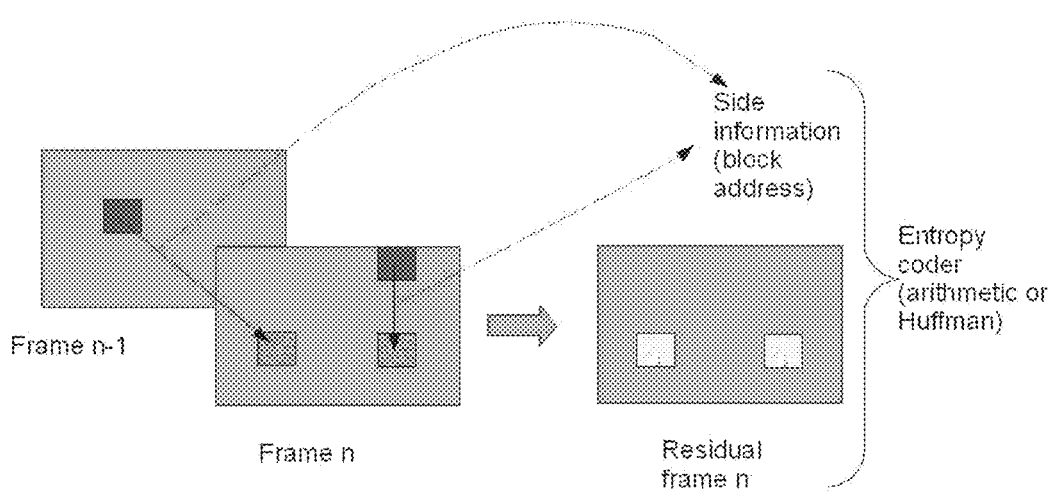
FIG. 9 is a schematic illustration of selection of candidates for block matching.

An illustration of the prediction in the encoder is shown in FIG. 9. This gives a high-level illustration of the block prediction in the encoder. The prediction residual together with side information is sent to the entropy coder. In the decoder the reverse procedure is performed, i.e. first reconstruct the residual frame and then reconstruct the frame given side information.

Details of a preferred method of signalling the intra and inter prediction information for prediction in the frequency domain are now discussed in more detail.

As mentioned, according to one aspect of the present invention a block is matched only to another whole block rather than to a block-sized area offset by any number of pixels as in more conventional block matching techniques. Therefore the signalling algorithm of the present invention sends block addresses instead of motion vectors, i.e. represented in terms of a whole number of blocks rather than a pixel offset. Note however that whilst the term "block" may be used herein, in its most general sense this is not intended to imply and particular size, shape or level subdivision. It will be appreciated that in different schemes then various different divisions and subdivisions may be referred to by terms such as macroblock, block and sub-block, etc., but that the term "block" as used most generally herein may correspond to any of these or indeed any other constituent image portion being a division of a video frame corresponding to multiple pixels. Whatever manner of division is employed, according to the present invention the address of the reference portion for use in prediction is signalled as a whole number of multi-pixel portions instead of a pixel offset.

In embodiments, the bitstream may also contain one or more prediction method flags indicating a prediction method to be used by the decoder (corresponding to that used by the encoder.

Further, the bitstream may contain a frame number of the reference block, as the reference block for prediction can be chosen from any of multiple different frames.

In one particularly preferred embodiment, the side information signalled in the bitstream to the decoder comprises: frame number, an addition or subtraction flag, absolute value flag, a macroblock address, a block address within the macroblock, and a sub-block address within the block. The signalling structure of this side information is shown in the following table.

| Field | No. Bits |
| --- | --- |
| Frame Index (FrameIdx) | 4 |
| Add/Sub | 1 |
| Nat/Abs | 1 |
| Macroblock Address (MBAddr) | 9 |
| Block Address (BlockAdr) | 3 |
| Sub-block Address (SubBAdr) | 2 |

For each resolution the prediction indexes cab be encoded as follows. This shows signalling structure size and encoding for a plurality of different resolutions.

| Inter | SIF | WVGA | 480p | 4CIF | 720p | 1080p | 4kx2k | 8kx4k | Values | Max | 4 bits | |
| --- | --- | --- | --- | --- | --- | --- | --- | --- | --- | --- | --- | --- |
| FrameIdx | 4 | 4 | 4 | 4 | 4 | 4 | 4 | 4 | −8 . . . 7 | | 0 | Intra |
| Sub/Add | 1 | 1 | 1 | 1 | 1 | 1 | 1 | 1 | 0 . . . 1 | | 1 | −1 |
| Nat/Abs | 1 | 1 | 1 | 1 | 1 | 1 | 1 | 1 | 0 . . . 1 | | 2 | −2 |
| MBAddrX | 5 | 6 | 6 | 6 | 7 | 7 | 8 | 9 | 0 . . . Max | 480 | 3 | −3 |
| MBAddrY | 4 | 5 | 5 | 6 | 6 | 7 | 8 | 9 | 0 . . . Max | 270 | 4 | −4 |
| BlockAdr | 3 | 3 | 3 | 3 | 3 | 3 | 3 | 3 | 0 . . . 5 | | 5 | −5 |

-continued

| Inter | SIF | WVGA | 480p | 4CIF | 720p | 1080p | 4kx2k | 8kx4k | Values | Max | 4 bits |
|---|---|---|---|---|---|---|---|---|---|---|---|
| SubBAdr | 2 | 2 | 2 | 2 | 2 | 2 | 2 | 2 | 0 ... 3 | 6 | −6 |
| Total/B | 20 | 22 | 22 | 23 | 24 | 25 | 27 | 29 | | 7 | −7 |
| Total/MB | 120 | 132 | 132 | 138 | 144 | 150 | 162 | 174 | | −8 | List |

Figure 3B:
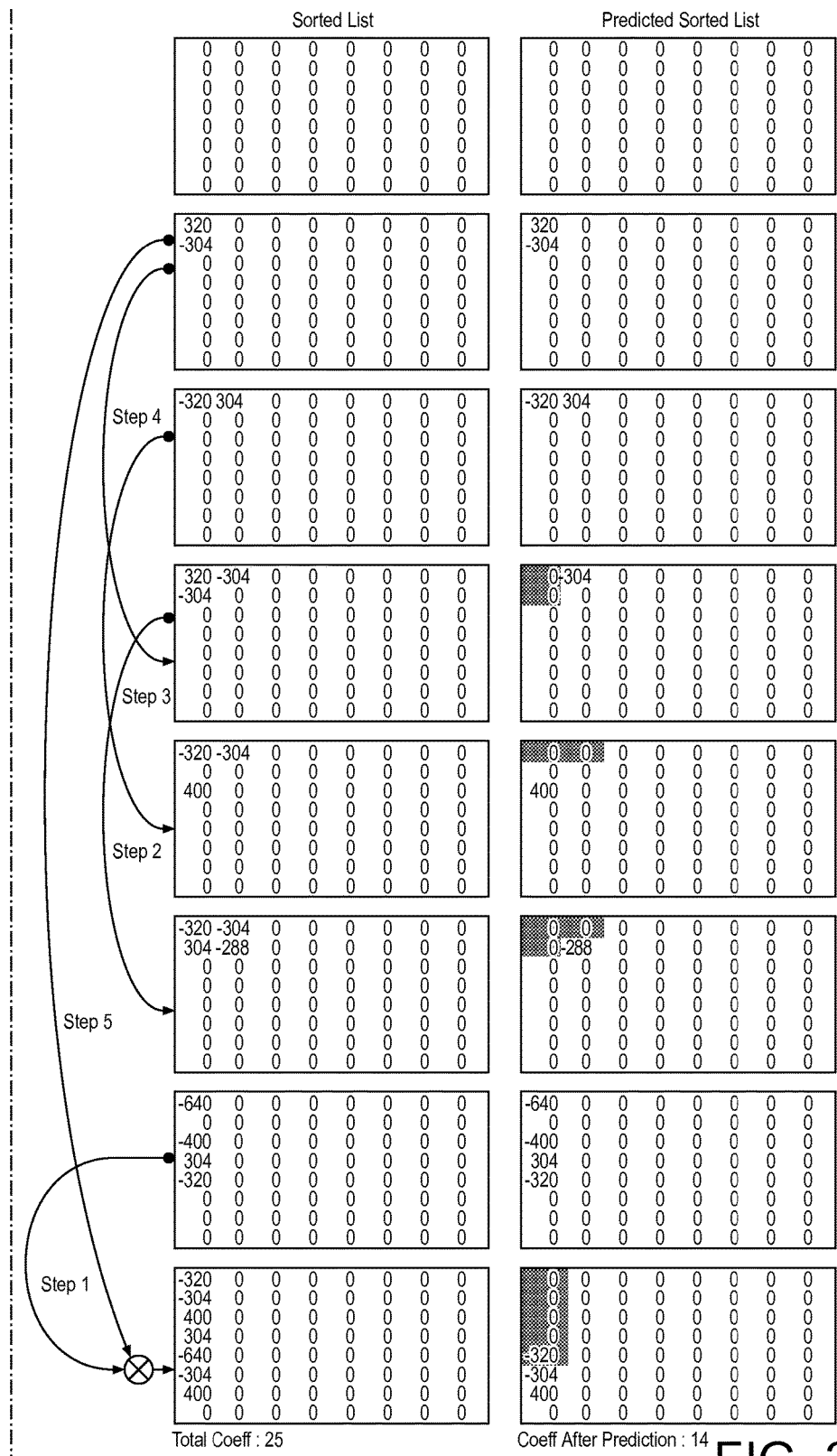
FIG. 3b illustrates an example of block matching prediction

This improved prediction scheme is more effective than the current prediction schemed which use a higher bit rate to signal only part of the information that the improved scheme can transmit. The streamlined inter and intra prediction allows for simplified signalling method. FIG. 3b shows a block matching prediction example achieving bit savings. The table below shows the effective side information and coding for multiple resolutions.

| | Res X | Res Y | MB_X | MB_Y | MBs | MBBits | UpToMBs | Bs | BBits | UpToBs | Bits_X | Bits_Y | Bits_XY |
|---|---|---|---|---|---|---|---|---|---|---|---|---|---|
| SIF | 320 | 240 | 20 | 15 | 300 | 9 | 512 | 1800 | 11 | 2048 | 5 | 4 | 9 |
| WVGA | 640 | 400 | 40 | 25 | 1000 | 10 | 1024 | 6000 | 13 | 8192 | 6 | 5 | 11 |
| 480p | 640 | 480 | 40 | 30 | 1200 | 11 | 2048 | 7200 | 13 | 8192 | 6 | 5 | 11 |
| 4CIF | 704 | 576 | 44 | 36 | 1584 | 11 | 2048 | 9504 | 14 | 16384 | 6 | 6 | 12 |
| 720p | 1280 | 720 | 80 | 45 | 3600 | 12 | 4096 | 21600 | 15 | 32768 | 7 | 6 | 13 |
| 1080p | 1920 | 1080 | 120 | 68 | 8160 | 13 | 8192 | 48960 | 16 | 65536 | 7 | 7 | 14 |
| 4k × 2k | 3840 | 2160 | 240 | 135 | 32400 | 15 | 32768 | 194400 | 18 | 262144 | 8 | 8 | 16 |
| 8k × 4k | 7680 | 4320 | 480 | 270 | 129600 | 17 | 131072 | 777600 | 20 | 1048576 | 9 | 9 | 18 |

The encoder elements 2, 4, 6, 8 and 10; and the decoder elements 12, 14, 16, 18 and 20 are each preferably implemented in software modules stored on any form of non-transitioning computer readable medium such as random access memory, read only memory, compact disk read only memory, a hard drive or flash memory and arranged for execution on a processor. However, in other embodiments some or all of these elements could be at least partially implemented in dedicated hardwired circuitry.

It should be understood that the block and flow diagrams may include more or fewer elements, be arranged differently, or be represented differently. It should be understood that implementation may dictate the block and flow diagrams and the number of block and flow diagrams illustrating the execution of embodiments of the invention.

It should be understood that elements of the block and flow diagrams described above may be implemented in software, hardware, or firmware. In addition, the elements of the block and flow diagrams described above may be combined or divided in any manner in software, hardware, or firmware.

In one possible embodiment, the invention may be implemented as an add-on to an existing encoder such as ISO standard H.264. That is, the input to the quantizer 4 in FIG. 4 will be an output from a standard encoder such as an H.264 encoder.

The above described embodiments of the present invention may provide several advantages. Matching blocks are located by examining the difference between blocks to be certain that the bit rate of the ultimately transmitted video data will be reduced with respect to the bit rate for sending coefficients of those blocks. Moreover, the pre sort has identified candidate blocks within which this comparison takes place. The blocks do not have to be physical neighbours in the image frame—instead, they are sorted on the basis of an index value associated with the blocks, for example, representing energy. This allows a best matching block to be selected from any part of a frame (or indeed a different frame). When selecting best candidates, the comparison of bit rates can take into account the overhead information that needs to be transmitted to identify that the block is a predicted block, and to identify the block from which it is predicted. The identity of the block from which it is predicted can be provided to the decoder in the form of an location within the frame expressed as a number of intervals of whole blocks, i.e. a block address, rather than by a motion vector expressed as an offset in terms of a number of pixels or even fractions of pixels.

The method described removes redundancy in the temporal and frequency domain before and/or after quantization in a compressed digital video stream by means of block prediction. The input to the method is a set of transformed and/or quantized transform coefficients of a set of frames in the temporal domain of the input video stream. The input video stream frame can be separated into blocks and groups of blocks. The groups of blocks are not limited by the location of the individual blocks participating in the group. The prediction is performed between the blocks of the current frame (intra) and is not limited by location of the blocks but by the factor of the block similarity. The same technique can be used for inter frame predictions. Inter frame block matching is not restricted by location either. The block similarity is determined from the point of view of reduction of bit rate.

Furthermore, as explained, in a preferred embodiment processing is carried out in the frequency domain where the transform has already compacted the energy of the target object such that comparison can now be carried out using a few frequency domain coefficients instead of a whole image. In these embodiments, both components of the method, i.e. processing in the frequency domain and the sort versus search, reduce the complexity while maintaining a very high quality. Another benefit of the method is that due to the low complexity of the calculations involved, the number of used reference frames for inter frame motion compensation can be substantially higher in comparison with existing algorithms. Another major benefit is that, due to the low complexity, matches can be made on several level sub block divisions. That is, an image portion can be a macroblock, a block or even a smaller number of pixels than a block. This is because the described method achieves low complexity and therefore incurs fewer of clock cycles, which if desired means that some of the saved complexity can then be spent searching for sub-blocks such as 4×4 or 2×2 sub-blocks instead of just blocks. Alternatively the search could be performed at a higher level of 16×16, 32×32 or 64×64 aggregate blocks for example, which would save on the side information necessary to signal them in the encoded stream.

A particular advantage arises from processing in the frequency domain. While there are frequency domain processing models existing, there is none that explores redundancy reduction as in the method described in the following embodiments; in particular which provides a unique set of benefits including complexity reduction, preserving and improving video quality and at the same time lowering the bit rate of the encoded video stream.

The method need not require loop filter or loop back to the spatial domain for motion estimation due to the fact that all processing is now concentrated in the frequency domain. This is a major advantage with respect to existing video coding methods and a point of significant reduction of complexity.

Another advantage is that processing of all the colour components can be done at the same time. That is, processing done in the luminance channel can affect processing done in the chrominance channels.

Another advantage of processing in the frequency domain relates to blocks lying on the edge of a frame or slice of a sub frame. That is, the blocks that lie on the edge of a frame (or if a sub frame separation in multiple slices is used, the blocks that are on the edge of the slice) can be efficiently predicted. As the blocks are grouped in accordance with similarity, the method allows grouping of blocks or slices in any order and hence there is no penalty in the prediction of blocks sitting on the edge of a slice or frame. This is a significant improvement in comparison with the current FMO (Flexible Macroblock Ordering) in the current Standards like MPEG-4 AVC/H.264.

Another advantage of the described embodiments of the invention herein is that deep sub-block sub-divisions can be utilised without excessive processor load.

It will be appreciated that the above embodiments have been described only by way of example.

For instance, note that whilst the term "block" is used herein, in its most general sense this is not intended to imply and particular size, shape or level subdivision. It will be appreciated that in different schemes then various different divisions and subdivisions may be referred to by terms such as macroblock, block and sub-block, etc., but that the term "block" as used most generally herein may correspond to any of these or indeed any other constituent image portion being a division of a video frame.

Further, the different preferred aspects of the invention need not necessarily be used in conjunction with one another. For example, it is possible to perform block matching in the frequency domain without using the additional technique of a sorted list based on block energy or other such index. Alternative block matching techniques could also be used, for either intra and/or inter frame block matching, e.g. by matching based on a measure of correlation or a measure of minimum error. Conversely, it is possible to used the sorting technique for block matching without a frequency domain transform, e.g. by determining a measure of block energy based on the spatial domain coefficients (though this is less preferred since it will tend to be more computationally intense).

Further, where sorting is discussed as a method of determining a subset of candidates within a search range A, note that it is not necessarily required to rearrange list entries in memory. More generally, the search for candidates may be performed by any method of identifying blocks having an energy or other index within the desired range.

Further, the sort index need not necessarily be a measure of block energy. Another possibility would be a metric relating to the structure of the block, such as the structural similarity index (SSIM). In other embodiments, multiple metrics could be combined in order to determine the index used for sorting. Furthermore, once the list is sorted, aspects of the invention need not necessarily be limited to finding the best match from amongst the candidates based on bitrate contribution. Other second metrics could be used for this purpose, e.g. a more conventional motion based matching as used in H.264.

Further, whilst the above has been described with reference to the example of a Discrete Cosine Transform into the frequency domain, it will be appreciated that other transforms such as the KLT or others can be used (some of which may not represent the transform domain in terms of spatial frequency coefficients but in terms of some other transform domain coefficients).

Further, whilst the above has been described in terms of a residual representing the subtracted difference between the coefficients of the target block and the coefficients of the reference block, this is not the only possibility for encoding the coefficients or values of the target block relative to those of the reference block. In other possible embodiments for example, the difference may be represented and signalled in terms of parameters of a correlation between the target block and the reference block such that the target can be predicted from the correlation, or in terms of coefficients of a filter that may be applied to the reference block to predict the target block. In these cases the prediction may not necessarily be lossless as in the case of a subtractive difference, but may instead be lossy such that the difference does not represent the exact difference. The term "difference" as used herein is not limited to subtractive difference nor to an exact difference.

The present invention is not limited to implementation in any particular standard nor as an add-on to any particular standard, and may be implemented either as a new stand-alone codec, an add-on to an existing codec, or as a modification to an existing codec.

Other variants may be apparent to a person skilled in the art given the disclosure herein. The invention is not limited by the described embodiments, but only by the appendant claims.

What is claimed is:

1. A method of compressing a video signal, comprising:
  receiving a video signal comprising a plurality of video frames, each frame representing an image at a different respective time, and each frame comprising a plurality of constituent blocks of the respective image;
  forming a sorted list of blocks that includes at least a plurality of current blocks to be encoded within a frame of the video signal, the plurality of blocks having both interframe and intraframe blocks;
  for each of the plurality of current blocks to be encoded within the frame of the video signal, including both the interframe and intraframe blocks of the plurality of blocks to be encoded, selecting a respective reference block by:
    determining a group of candidate blocks from the sorted list of blocks, the group of candidate blocks comprising at least some candidate blocks that are not adjacent to the current block; and selecting one of the candidate blocks as the reference block based in part on a number of bits to encode, in an encoded bitstream, both difference data for the current block relative to the candidate block and side information that identifies the candidate block as the reference block using a position of the reference block relative to a fixed point in the frame that is specified in the side information as a whole number of blocks from the fixed point in the frame;

for each of the plurality of current blocks to be encoded within the frame of the video signal, generating the difference data for the current block relative to the respective reference block that is selected;

generating the encoded bitstream to include for the plurality of current blocks the generated difference data and the side information; and outputting the bitstream for a decoder.

2. The method of claim 1, wherein:

determining the group of candidate blocks comprises searching a set of blocks to select a subset of candidate blocks based on a first metric other than spatial proximity to the current block, the subset of candidate blocks that is selected comprising at least some candidate blocks that are not adjacent to the current block; and selecting the one of the candidate blocks as the reference block comprises selecting one of the candidate blocks as the reference block based on a second metric, different from the first metric, the second metric relating to a number of bits to encode, in the encoded bitstream, both the difference data and the side information identifying the candidate block as the reference block.

3. The method of claim 2, wherein determining the group of candidate blocks is performed once for a plurality of said reference blocks, and the plurality of said reference blocks is selected from a same subset of candidate blocks.

4. The method of claim 2, wherein determining the group of candidate blocks comprises searching each of the blocks of at least one frame.

5. The method of claim 2, wherein the first metric is a measure of block energy.

6. The method of claim 5, wherein determining the group of candidate blocks comprises selecting a subset of candidate blocks based on block energy of the candidate blocks relative to block energy of the current block.

7. The method of claim 5, wherein each block comprises a plurality of coefficients, and said measure of block energy comprises one of: a number of zero coefficients in the block, a number of non-zero coefficients in the block, and an average or total of a modulus of coefficients in the block.

8. The method of claim 2, wherein the first metric is evaluated with respect to transform domain coefficients.

9. The method of claim 8, wherein block energy is evaluated based on the transform domain coefficients.

10. The method of claim 2, wherein forming the sorted list of blocks comprises sorting the plurality of current blocks into an order according to the first metric, and determining the group of candidate blocks from the sorted list of blocks comprises selecting a subset of candidate blocks based on proximity to the current block within the sorted list of blocks.

11. The method of claim 10, wherein selecting the one of the candidate blocks as the reference block comprises selecting the subset of candidate blocks within a predetermined window of the current block within the sorted list of blocks.

12. The method of claim 1, wherein each block comprises a plurality of coefficients, and said difference data is generated for all the coefficients of the current block based on all the coefficients of the reference block.

13. The method of claim 1, wherein selecting the one of the candidate blocks as the reference block comprises selecting the candidate block that, to encode both the difference data and the side information identifying the candidate as the reference block, uses the fewest bits in the encoded bitstream.

14. The method of claim 1, further comprising, prior to selecting the reference blocks, transforming blocks of one or more frames from a spatial domain representation to a transform domain representation to generate a respective set of transform domain coefficients for each block, the difference data being generated based on the transform domain coefficients.

15. The method of claim 1, wherein selecting the one of the candidate blocks as the reference block is further based in part on a bitrate to encode both the difference data and the side information identifying the candidate as the reference block.

16. The method of claim 15, wherein the bitrate is determined by summing log 2 probabilities of a plurality of different possible symbols for representing the difference data and the side information.

17. The method of claim 1, wherein generating the encoded bitstream comprises entropy encoding the difference data and side information.

18. The method of claim 17, wherein the number of bits to encode, in the encoded bitstream, the difference data and side information comprises the number of bits to encode the difference data and side information using the entropy encoding.

19. The method of claim 1, further comprising quantizing the blocks of each frame prior to selecting the respective reference block and generating the difference data for the current block relative to the respective reference block.

20. The method of claim 1, wherein for each of the plurality of current blocks to be encoded within a current frame of the video signal, selecting the respective reference block comprises selecting a respective reference block in the current frame, and generating the respective difference data according to an intraframe prediction of the current block by reference to the reference block in the current frame.

21. The method of claim 20, wherein determining the group of candidate blocks for the current frame comprises searching all the blocks of current frame.

22. The method of claim 20, wherein reference blocks selected for the intraframe prediction are selected from a same subset of candidates as reference blocks selected for an interframe prediction.

23. The method of claim 1, wherein for each of the plurality of current blocks to be encoded within a current frame of the video signal, selecting the respective reference block comprises selecting a respective reference block in a preceding frame, and generating the respective difference data according to an interframe prediction of the current block by reference to the reference block in the preceding frame.

24. The method of claim 23, wherein determining the group of candidate blocks comprises searching all the blocks of the preceding frame.

25. The method of claim 23, wherein the side information identifies the preceding frame.

26. The method of claim 23, wherein reference blocks selected for the interframe prediction are selected from a same subset of candidates as reference blocks selected for an intraframe prediction.

27. In a digital environment, a system to compress a video signal by one or more computing devices, the system comprising:
one or more processors; and
a memory configured to store instructions that are executable via the one or more processors to cause the one or more computing devices to compress a video signal by performing operations comprising:
receiving the video signal comprising a plurality of video frames, each frame representing an image at a different respective time, and each frame comprising a plurality of constituent blocks of the respective image;
sorting at least a plurality of current blocks to be encoded within a frame of the video signal to form a sorted list of blocks;
for each of a plurality of current blocks to be encoded within a frame of the video signal, selecting a respective reference block by:
determining a group of candidate blocks from the sorted list of blocks, the group of candidate blocks comprising at least some candidate blocks that are not adjacent to the current block, the group of candidate blocks that is determined being selectable as reference blocks for encoding current blocks of both intraframes and interframes in the video signal; and
selecting one of the candidate blocks as the reference block based in part on a number of bits to encode, in an encoded bitstream, both difference data for the current block and side information identifying the candidate block as the reference block, the side information identifying a corresponding frame in which the reference block is included and a block address of the reference block within the corresponding frame, the block address specified in the side information as a whole number of blocks relative to a fixed point in the corresponding frame;
for each of the plurality of current blocks to be encoded within the frame of the video signal, generating difference data for the current block relative to the respective reference block that is selected;
generating the encoded bitstream to include for the plurality of current blocks the generated difference data and side information; and
outputting the bitstream for a decoder.

28. An encoder for compressing a video signal, the video signal comprising a plurality of video frames, each frame representing an image at a different respective time, and each frame comprising a plurality of constituent blocks of the respective image, the plurality of constituent blocks having both interframe and intraframe blocks; the encoder comprising:
one or more processors; and
a memory configured to store instructions that are executable via the one or more processors to implement a prediction coding module and an output module of the encoder, wherein:
the prediction coding module is configured, for each of a plurality of current blocks to be encoded within a frame of the video signal, including both the interframe and intraframe blocks of the plurality of blocks to be encoded, to select a respective reference block by:
determining a group of candidate blocks from a sorted list of blocks that includes at least the plurality of current blocks to be encoded within the frame of the video signal, the group of candidate blocks comprising at least some candidate blocks that are not adjacent to the current block; and
selecting one of the candidate blocks as the reference block based in part on a number of bits to encode, in an encoded bitstream, both difference data for the current block and side information that identifies the candidate block as the reference block using a reference to a corresponding frame in which the reference block is contained and an address of the reference block specified in the side information as a whole number of blocks relative to a fixed point in the corresponding frame rather than using a vector relative to the current block to identify the reference block;
the prediction coding module further configured, for each of the plurality of current blocks to be encoded within the frame of the video signal, to generate difference data for the current block relative to the reference block that is selected; and
the output module is configured to generate the encoded bitstream to include for the plurality of current blocks the difference data and the side information, and to output the bitstream for a decoder.

* * * * *